United States Patent
Hoppe et al.

(10) Patent No.: US 8,237,321 B2
(45) Date of Patent: Aug. 7, 2012

(54) ELECTRICAL MACHINE, IN PARTICULAR A GENERATOR

(75) Inventors: Thomas Hoppe, Lemgo (DE); Johannes Wollenberg, Gräfelfing (DE)

(73) Assignee: Siemens Aktiengesellschaft, München (DE)

( * ) Notice: Subject to any disclaimer, the term of this patent is extended or adjusted under 35 U.S.C. 154(b) by 840 days.

(21) Appl. No.: 12/293,935

(22) PCT Filed: Jan. 26, 2007

(86) PCT No.: PCT/EP2007/050787
§ 371 (c)(1),
(2), (4) Date: Sep. 22, 2008

(87) PCT Pub. No.: WO2007/107399
PCT Pub. Date: Sep. 27, 2007

(65) Prior Publication Data
US 2009/0134626 A1     May 28, 2009

(30) Foreign Application Priority Data
Mar. 22, 2006   (DE) .......................... 10 2006 013 590

(51) Int. Cl.
*H02K 21/12*    (2006.01)
*H02K 41/00*    (2006.01)
(52) U.S. Cl. .............. 310/156.36; 310/156.35; 310/268; 310/112; 310/12.01
(58) Field of Classification Search .... 310/12.01–12.33, 310/112, 114, 268, 156.35
See application file for complete search history.

(56) References Cited

U.S. PATENT DOCUMENTS

| | | | | |
|---|---|---|---|---|
| 4,563,602 A | * | 1/1986 | Nagasaka | 310/12.22 |
| 5,315,159 A | | 5/1994 | Gribnau | |
| 5,844,341 A | | 12/1998 | Spooner | |
| 6,087,742 A | * | 7/2000 | Maestre | 310/12.24 |
| 6,703,724 B1 | * | 3/2004 | Revill et al. | 310/12.24 |
| 7,548,008 B2 | * | 6/2009 | Jansen et al. | 310/266 |
| 2005/0285467 A1 | | 12/2005 | Shimizu | |
| 2006/0071575 A1 | * | 4/2006 | Jansen et al. | 310/266 |

FOREIGN PATENT DOCUMENTS

| | | |
|---|---|---|
| DE | 196 36 591 A1 | 3/1998 |
| DE | 196 52 673 A1 | 6/1998 |
| DE | 10 2004 013 098 A1 | 10/2005 |
| EP | 0 373 987 A1 | 6/1990 |
| EP | 0 627 805 A2 | 12/1994 |
| WO | WO 2004/017497 A1 | 2/2004 |
| WO | WO 2004017497 A1 * | 2/2004 |
| WO | WO 2005/088812 A1 | 9/2005 |
| WO | WO 2006/052173 A1 | 5/2006 |

* cited by examiner

*Primary Examiner* — Quyen Leung
*Assistant Examiner* — Leda Pham
(74) *Attorney, Agent, or Firm* — Henry M. Feiereisen; Ursula B. Day

(57) ABSTRACT

The invention relates to an electrical machine (1, 2, 210) or its use as a wind power generator and a wind power installation having this electrical machine. The electrical machine has a primary part (3, 4, 222, 212, 213) and a secondary part (5, 6, 224), wherein a disc-like primary part (3, 4, 222, 212, 213) and a disc-like secondary part (5, 6, 224) are provided for forming a disc-shaped air gap, or wherein the electrical machine (1, 2, 210) has a cylindrical primary part (3, 4, 212, 213) and a cylindrical secondary part (5, 6, 224) for forming a cylindrical air gap, wherein a primary part, which can be used for a linear motor, is also used for forming the cylindrical primary part (3, 4, 222, 212, 213).

30 Claims, 16 Drawing Sheets

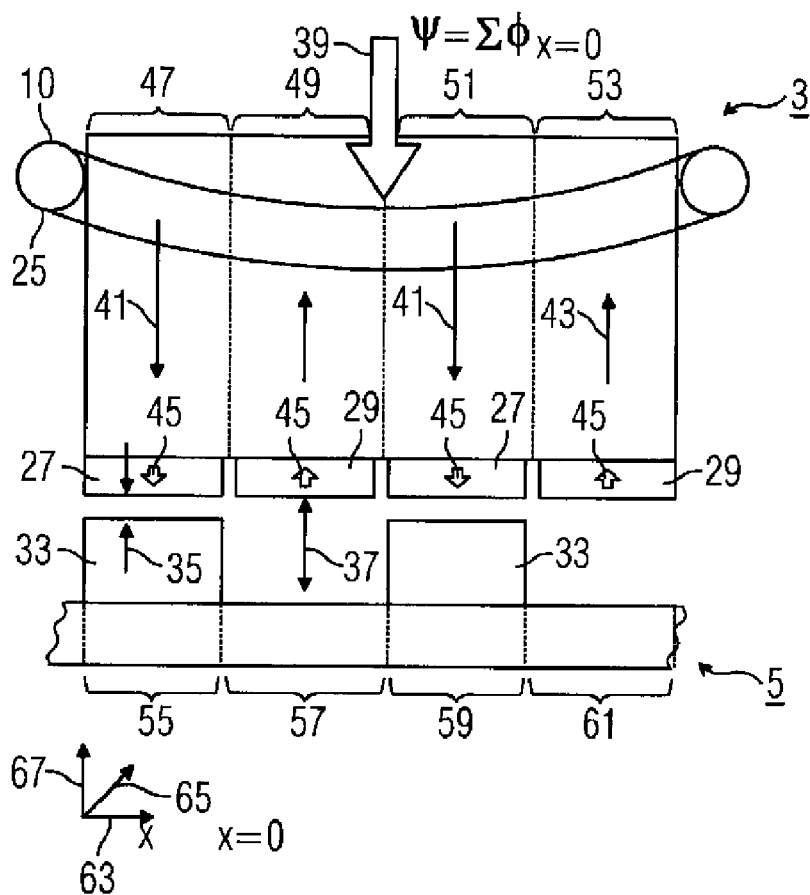
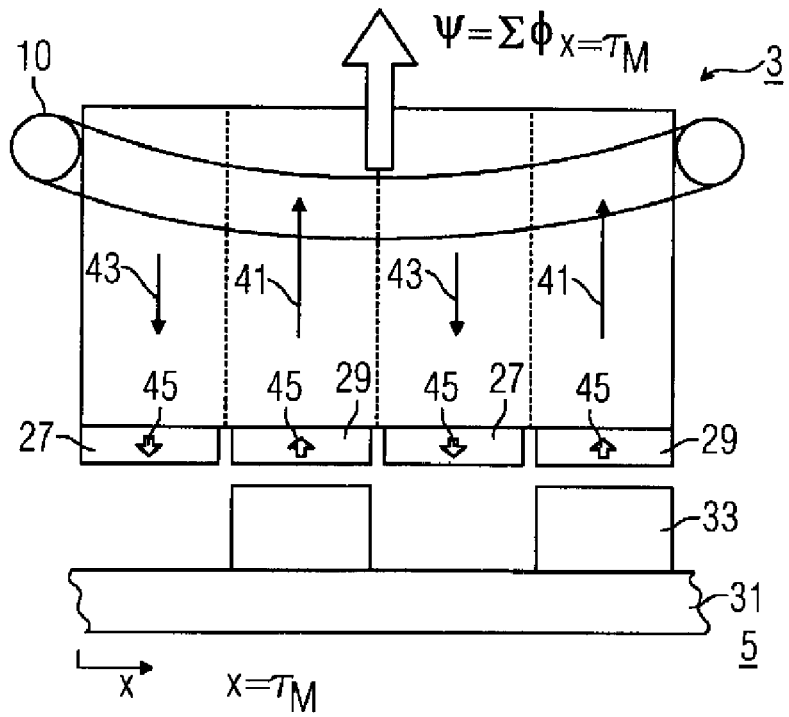

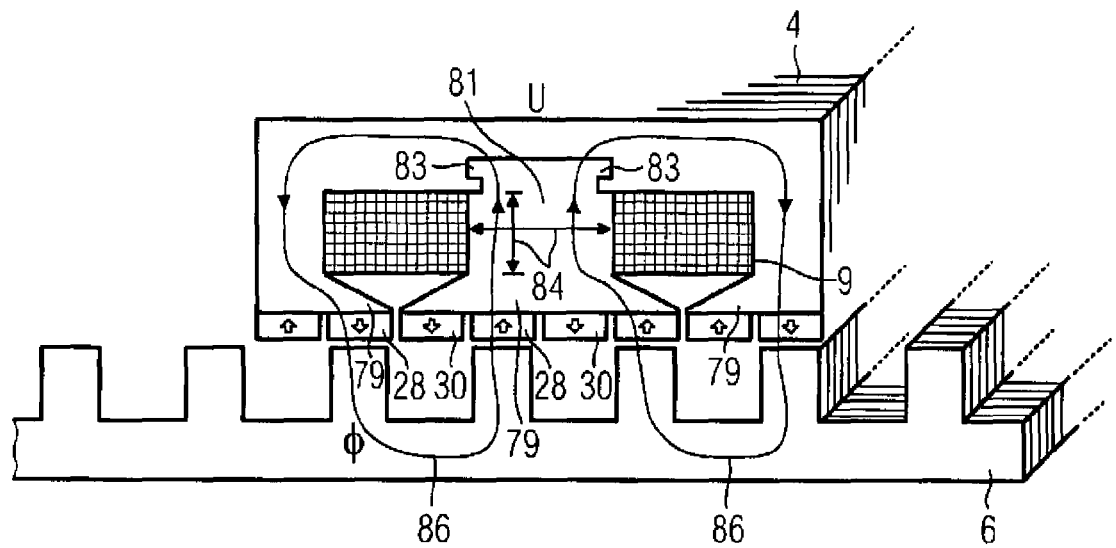
FIG 14
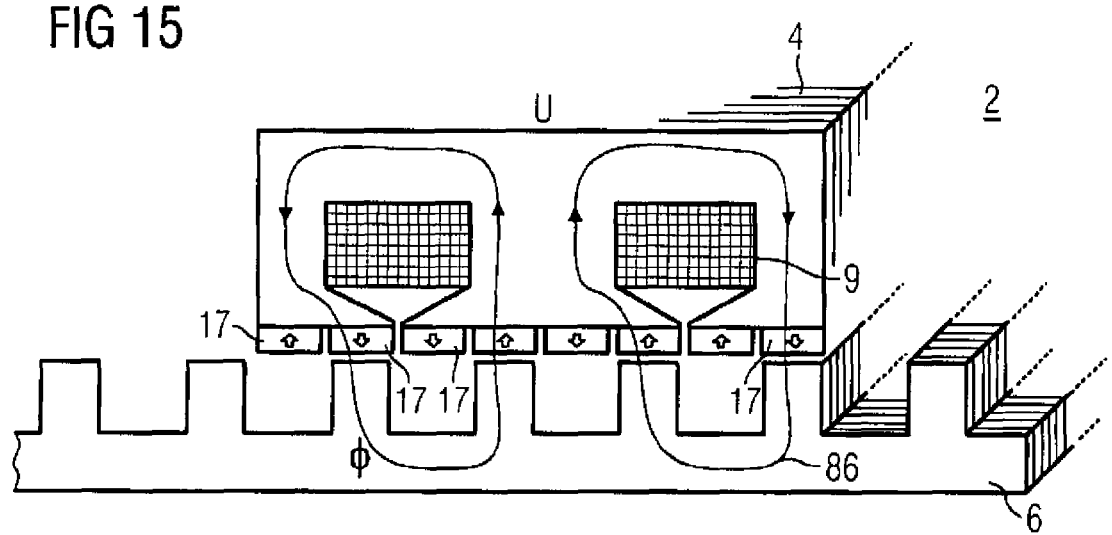
FIG 15
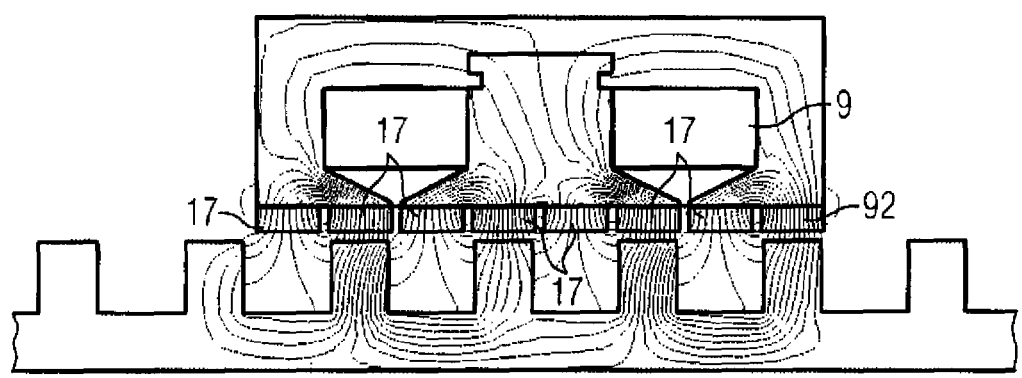

FIG 17
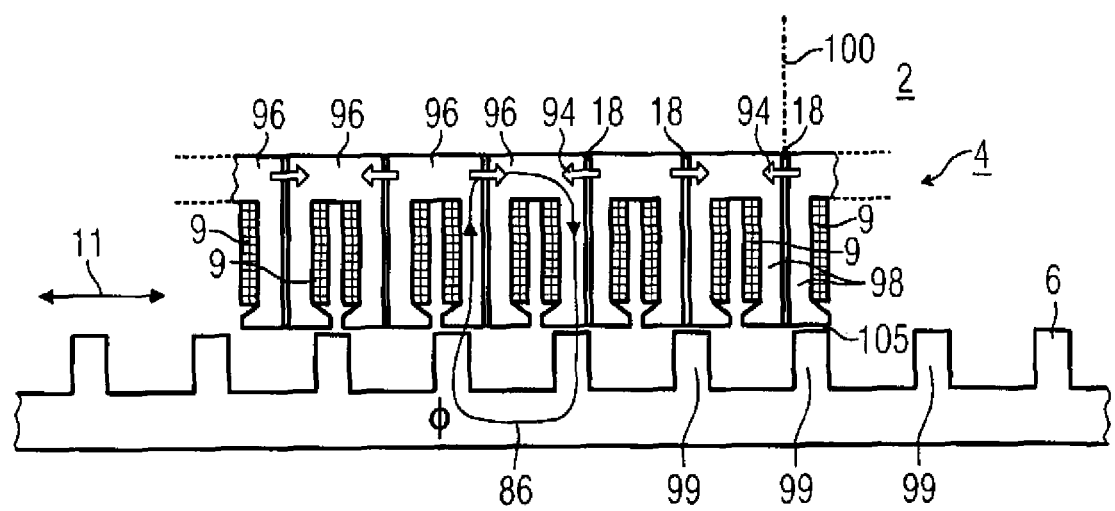
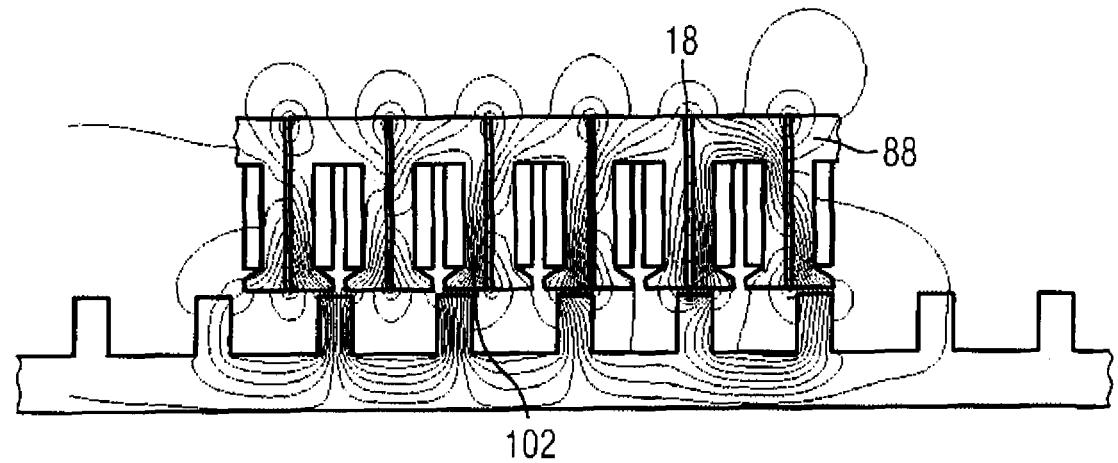

FIG 18
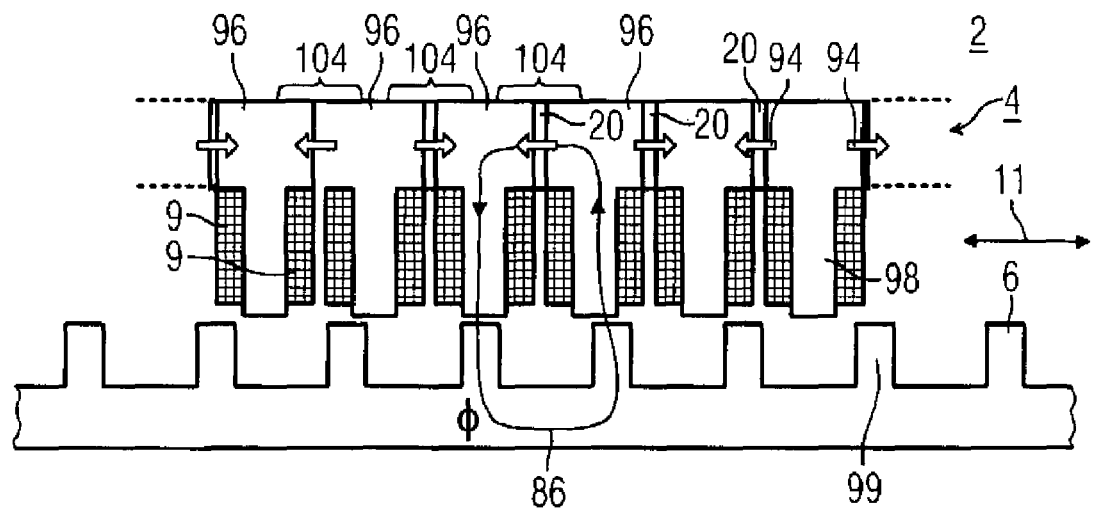
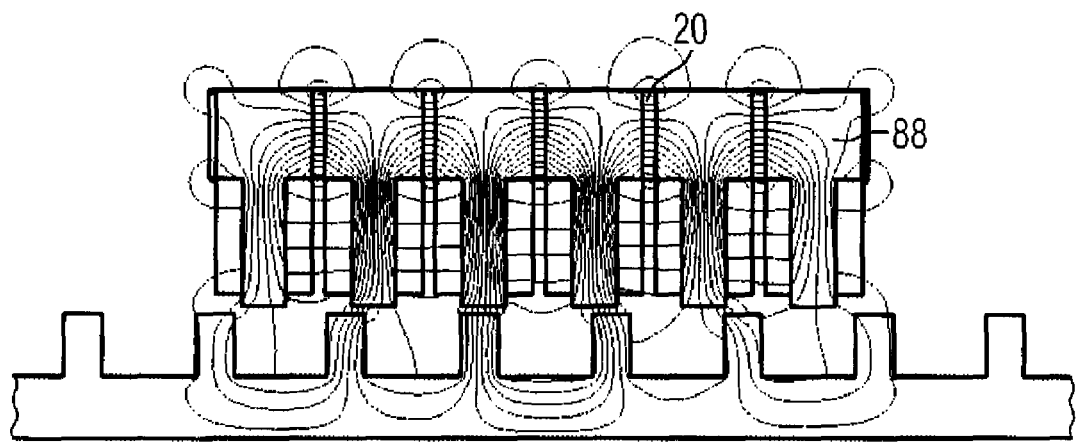

ELECTRICAL MACHINE, IN PARTICULAR A GENERATOR

BACKGROUND OF THE INVENTION

The invention relates to an electrical machine, in particular a generator, with the generator being used in a wind power installation. The electrical machine has a primary part and a secondary part, with both the primary part and the secondary part having a circular contour. The generator which is used in a wind power installation is a wind power generator. Wind power generators are used as mechanical/electrical energy converters in order to obtain energy from wind power. These generators are normally installed at high altitudes. Furthermore, the wind power installation can be used on land, on the coast or else at sea.

At the moment, wind power generators have two major components which can be fitted together or separately, and comprise a stator and a rotor. The two components have a basic cylindrical shape. The wind power generator—referred to as a generator for short—is in this case designed as a unit based on the given and/or expected wind conditions and based on a desired rating. This unit is very large and heavy. Installation, servicing and repair require heavy and expensive equipment, for example heavy-lift helicopters or heavy-lift cranes.

SUMMARY OF THE INVENTION

The object of the present invention is to specify an electrical machine which is not only physically compact but can also be used flexibly. Use relates in particular to use as a wind power generator in a wind power installation.

According to one aspect of the present invention, this object is achieved by an electrical machine, with the electrical machine having a primary part and a secondary part, wherein the electrical machine has a primary part like a disk and a secondary part like a disk in order to form an air gap in the form of a disk, or wherein the electrical machine has a primary part like a cylinder and a secondary part like a cylinder in order to form a cylindrical air gap, with a primary part which can be used for a linear motor also being used to form the primary part which is like a cylinder.

According to another aspect of the present invention, this object is achieved by a wind power generated which is in the form of an electrical machine, as set forth above.

According to yet another aspect of the present invention, this object is achieved by a wind power installation which has at least one blade and has a wind power generator, as set forth above, wherein the secondary part is mechanically coupled to the blade.

According to still another aspect of the present invention, this object is achieved by a wind power installation which has at least one blade and has a wind power generator as set forth above, wherein the primary part is mechanically coupled to the blade.

An electrical machine which, in particular, is a generator, with the electrical machine having a primary part and a secondary part, can be designed such that the electrical machine has a primary part like a disk and a secondary part like a disk in order to form an air gap in the form of a disk, or that the electrical machine has a primary part like a cylinder and a secondary part like a cylinder in order to form a cylindrical air gap, with a primary part which can be used for a linear motor also being used to form the primary part which is like a cylinder. If the electrical machine has a disk-like primary part and a disk-like secondary part, then the disk-like primary part and the disk-like secondary part can be arranged with respect to one another such that a disk-like air gap is thus formed between the primary part and the secondary part. The disk-like configuration of the electrical machine differs from a cylindrical configuration of an electrical machine in that, although the electrical machine can still carry out a rotary movement, the magnetic fields across the air gap are not, however, aligned radially towards the rotation axis but are aligned parallel to the rotation axis of the electrical machine. The electrical machine, which is in the form of a disk and is designed in this way, can be compared with a linear motor which is forced onto a circular path.

The electrical machine is, in particular, of the synchronous machine type. Synchronous machines may be self-excited or else externally-excited. Generators are typically synchronous machines.

In one refinement, a) the primary part of the electrical machine has primary part segments, and/or b) the secondary part of the electrical machine has secondary part segments, in particular with the primary part segments having windings, in particular with a primary part which can be used for a linear motor also being used to form the primary part which is like a disk.

The primary part therefore has windings through which current can flow, with these windings advantageously being arranged in an area of the primary part which represents an outer area of the disk with respect to the disk shape. This makes it possible to achieve a large moment. A corresponding situation applies to the parts which form the secondary part. By way of example, the secondary part has permanent magnets which are positioned on the secondary part in the same radius region as the windings on the primary part. If, instead of the permanent magnets, the secondary part has only means for guidance of a magnetic field, with this means having a tooth structure, then this tooth structure is also positioned on the secondary part such that the tooth structure is opposite that part of the primary part which is intended to form the electromagnetic fields.

The design in the form of a disk allows a particularly compact configuration. Furthermore, the use of primary parts which can be provided for use in a linear motor allows the electrical machine to have a flexible configuration. In particular, this is because primary parts such as these of electric linear motors are intended for individual installation and individual connection.

The embodiments of the electrical machine in the form of disks and the circular contour of the primary part and/or of the secondary part which results from this as well as the corresponding circular arrangement of the segments by positioning them like a polygon always relates to the area of the air gap of the electrical machine. The electrical machine which, for example, has a housing, may have different contours and shapes with respect to its housing, which contours and shapes are not only circular in form, but also rectangular or else some other form.

The primary part segment or segments for forming the primary part of the electrical machine in particular have its or their own electrical connections. Furthermore, individual primary part segments can easily be fitted and removed via detachable connections such as screw connections, clamping connections or the like. For this purpose, in particular, the primary part segment has holes for a screw to be passed through. In one further refinement of the primary part segment, this segment has its own encapsulation. The windings which are made in the laminated core of the primary part segment are thus encapsulated. This is typical for a primary part of a linear motor.

In contrast to a traditional electrical machine, in which the stator and the rotor each form one component, the electrical machine advantageously has a primary part which is formed from a plurality of linear-motor/generator components. The linear-motor/generator components which represent the segments of the primary part and secondary part respectively can in this case advantageously be fitted to any desired diameter, but advantageously not too small, of a component which is caused to rotate by wind power. This component which is caused to rotate by wind power has, for example, a blade. The secondary part is, for example, fitted to a moving part, with this being the component which is caused to rotate. The primary part is then fitted in a corresponding manner to a component which is stationary with respect thereto.

The electrical machine can therefore advantageously be formed from a plurality of individual segments. The air gap in the electrical machine may in this case either be in the form of a disk or cylinder.

The segments of the primary part, that is to say the primary part segments, are active parts of the electrical machine, with these advantageously being equivalent to those of a conventional linear motor, as described above. This conventional linear motor may, for example, be in a linear or else cuboid form. In order to increase the rating of the electrical machine, it is also possible to provide a double-comb version.

If the electrical machine has a large diameter, in this case with this being a diameter of >1 m or else of >2 or more meters, it is also possible to use conventional linear motor secondary parts (linear, cuboid) in particular for a cylindrical motor, without the losses becoming excessive. This is because the air gap changes resulting from the chord formation do not have a significant effect on the rating of the electrical machine.

In order to optimize the power output, it is possible in one advantageous modification of the primary part of a conventional linear motor for the primary part segment to have a curved shape. The curved shape relates in particular to that side of the primary part segment which faces the air gap. The curved shape makes it simple for the electrical machine to have a cylindrical configuration. In particular, the curved shape is achieved by the laminated core of the primary part segment having a curved shape. A circular shape is obtained by arranging a plurality of primary part segments with a curved shape in a row.

The secondary part of the electrical machine may be in the form of a passive part, and, depending on the magnitude of the diameter and depending on the configuration shape (cylindrical or in the form of a disk), this is also curved corresponding to the primary part.

In order to increase the rating of the electrical machine and/or to neutralize the externally acting attraction forces between the primary part and the secondary part, the electrical machine may be designed with the air gap, which is in the form of a disk, being in the form of a so-called double comb.

Furthermore, in order to increase the power which can be output from the electrical machine and/or in order to separate the functions of "starting", "fast running" or the like, different primary part segments may be used which are fitted on different diameters or radii. This results in an interleaved arrangement of primary part segments, and of their associated secondary parts as well.

The secondary part of the electrical machine may be formed from one or more parts, that is to say segmented.

A segmented configuration of the electrical machine in the form of building blocks, which is used in particular as a generator in a wind energy installation, allows both flexible and low-cost configuration as well as flexible and low-cost production, assembly and removal. Another advantageous feature is that the rating of the electrical machine can be retrospectively increased or else reduced. This is done by additionally fitting and connecting at least one additional primary part segment. The rating can be reduced by removing a primary part segment. Since a primary part segment can in each case be attached separately to a mount, and the primary part segment also has its own electrical connection, simple and cost-effective repair is also possible in the event of replacement parts being required. This is particularly important in the case of wind power installations since access to them is difficult because of the high positioning of the electrical machine that is used as a generator.

In the case of wind power installations, for example, the use of the electrical machine according to the invention is also advantageous because of the situation described in the following text. If, for example, a low torque is expected because of the local wind conditions, then there is no need to fit primary part segments to the entire generator circumference. In the extreme, just one primary part segment is sufficient on the machine or on its circumference.

Various embodiments of the electrical machine according to the invention will be described in the following text, some of which have already been mentioned above.

The electrical machine can be designed such that the primary part has primary part segments and/or such that the secondary part has secondary part segments, in particular with the primary part segments having windings, in particular with a primary part which can be used for a linear motor also being used to form the primary part which is like a disk. The primary part which can also be used for a linear motor is a primary part segment. In general, the primary part segment advantageously has at least one of the following features:

its own electrical connection
encapsulation
means for attaching the primary part segment.

One or more of the primary part segments forms or form the primary part of the electrical machine.

Its own electrical connection advantageously has a device for forming a detachable electrical contact. Contacts such as these are, for example, terminal contacts, screw contacts or the like.

For easy fitting, the primary part segment or segments can be mounted on a mount as a mounting device. Secondary part segments can also be mounted detachably, or else non-detachably, on a further mounting device.

In one advantageous refinement, the mounting device is also intended to be used as a guide device for guidance of the moving part of the electrical machine. The moving part is either the primary part or the secondary part. The primary part segments can also each be guided individually or in groups by the guide device with respect to the primary part.

As already described above, the arrangement of the segments, in particular of the primary part segments, results in a circular contour. The primary part segments and/or the secondary part segments are in consequence arranged, for example, like a polygon, with the arrangement like a polygon resulting in a circular contour.

In one advantageous refinement, the primary part of the electrical machine has a circular shape like a polygon, with the secondary part having a better circular shape than the primary part. This allows the use of primary parts of a linear motor as a primary part segment without making the harmonic characteristics of the electrical machine unnecessarily worse.

In a further refinement, the primary part segment has a laminated core, with the laminated core having slots for holding the windings, and with the slots in particular being arranged parallel to one another.

The secondary part can be designed such that it has permanent magnets which in particular are positioned alongside one another with an angle offset, such that this leads to the formation of a circular shape.

In order to allow low-cost secondary parts to be produced, the electrical machine can also be designed such that, in particular, it is a synchronous machine, with the primary part having windings as a first means for production of a first magnetic field, and with the secondary part having a means for guidance of the magnetic field, with the primary part having at least one further means for production of a further magnetic field, in particular with the first means for production of the first magnetic field being arranged with respect to the further means for production of the further magnetic field such that it is possible for the further magnetic field to be superimposed on the first magnetic field. For this purpose, the means on the secondary part side has a tooth structure for guidance of a magnetic field.

The electrical machine according to the invention is advantageously used as a wind power generator.

Wind power generators can be fitted in a pod on a mast. In order to allow the wind power generator to be fitted easily within a pod whose interior can be entered, the wind power generator is fitted such that the primary part faces the mast and the secondary part faces away from the mast.

The wind power generator is either designed such that the primary part is mechanically firmly connected to the pod, or such that the secondary part is mechanically firmly connected to the pod. That part which is not mechanically firmly connected is connected to a blade of a wind power installation.

The flexible design of the electrical machine according to the invention, which can be used as a wind power generator, makes it possible to couple two or more wind power generators. By way of example, the coupled wind power generators are arranged axially one behind the other. However, for example, it also possible in the case of a wind power generator in the form of a disk for disks of different circumference (→different diameter) each to form one wind power generator, or for the disks to lie on one plane.

A wind power installation has at least one blade, with the secondary part of the wind power generator in one embodiment being mechanically firmly coupled to the blade. In a further embodiment, the primary part is mechanically firmly coupled to the blade.

A type of electrical machine in which the secondary part has no permanent magnets or else electrical windings can be used for electrical machines which need not be completely fitted with primary part segments on the circumference. However, the secondary part has a means for guidance of a magnetic field. This type has the advantage that it costs little and that it makes it possible to avoid the often undesirable magnetic field of conventional synchronous linear-motor secondary parts which are fitted with permanent magnets. This allows the fitting process to be simplified. The type, which can also be used for primary parts which are fitted with primary part segments over their entire circumference, will be described in the following text.

In an electrical machine of this type, the primary part is designed such that it has two means for production of a magnetic field. The secondary part has no means for production of a magnetic field. The primary part therefore has a first means for production of a magnetic field, and a further means for production of a magnetic field, in which case an AC voltage, or an alternating current, can be applied to the first means for production of a magnetic field. By way of example, the first means for production of a magnetic field, which is a first magnetic field, is a winding. The further means for production of a magnetic field, which is an excitation field, is a means by which a further, that is to say at least a second, magnetic field can be produced. The field excitation which the further magnetic field produces is advantageously unchanged, that is to say constant, during operation. A further means such as this for production of the further magnetic field is, for example, a permanent magnet or a winding to which a constant current is or can be applied. The further means for production of a further magnetic field advantageously has a multiplicity of further means for production of magnetic heteropolar field excitation.

The first means for production of a first magnetic field is, for example, a coil winding, with the first magnetic field which emerges from or enters the coil being passed to further means (that is to say second, third, etc.) for production of further magnetic fields such that at least two further means for production of further magnetic fields are located in the field area of the first magnetic field, thus resulting in interaction between the two magnetic fields. The further means for production of further magnetic fields advantageously have a multiplicity of respectively mutually opposite magnetization directions, thus resulting in an arrangement with heteropolar magnetization.

The electrical machine, which has a primary part and a secondary part, with the primary part having a first means for production of a first magnetic field and with the secondary part having a means for guidance of the magnetic field, is therefore designed such that the primary part has at least two further means for production of at least two further magnetic fields, with the first means for production of the first magnetic field being arranged with respect to the further means for production of the further magnetic field such that it is possible for the further magnetic field to be superimposed on the first magnetic field.

An electrical machine designed in this way has the advantage that the secondary part of the electrical machine has no active means for production of a magnetic field. The secondary part of an electrical machine such as this has only one means for guidance of magnetic fields and can therefore be manufactured easily and at low cost.

By way of example, the secondary part is laminated, in order to avoid eddy currents. Soft-iron parts can advantageously be used for the physical structure of the primary part and secondary part. Lamination of these parts reduces eddy currents. In further embodiments, the soft-iron parts may also be solid and/or in the form of so-called powder pressed parts.

The machine type can also be configured such that the electrical machine has a primary part and a secondary part, and the primary part has a first means for production of a first magnetic field, as well as a further means for production of a further magnetic field, with the first means being a winding and the further means being at least one permanent magnet. In particular, the further means is a multiplicity of means, that is to say a multiplicity of permanent magnets. In a refinement of the electrical machine according to invention such as this, all the means for production of a magnetic field are located in the primary part. The secondary part has only one means for guidance of the magnetic fields, and, for example, is designed such that it has teeth on the surface facing the primary part. In particular, this means is a means containing iron, for example a laminated core.

The secondary part and/or the primary part are/is configured, for example, such that they or it have or has teeth. The tooth pitch on the secondary part and the tooth pitch or magnet pitch on the primary part may be either the same or else different. For example, if the pitch is the same, coils in one motor phase are grouped and are arranged with an offset of 360°/m with respect to further coil groups of the other motor phases. "m" denotes the number of phases. The tooth pitch of the secondary part (Tau_Sec) predetermines the pole pitch of the machine (Tau_p), such that, Tau_tooth,sec=2*Tau_p.

In one embodiment of the electrical machine, the tooth pitch of the secondary part is, for example, an integer multiple of the magnet pitch of the primary part. However, the electrical machine can also be designed such that the tooth pitch of the secondary part is not an integer multiple of the magnet pitch of the primary part.

The permanent magnets can be integrated in the primary part such that coils (windings) and magnets (permanent magnets) are accommodated in the same part (primary part) of the electrical machine. A short-stator design requires considerably less magnetic material than the known motor principle. The secondary part advantageously comprises just an iron reaction rail.

In a further advantageous refinement of the electrical machine, the further means for production of a magnetic field (for example a permanent magnet), which is embedded in soft-magnetic magnetic circuit sections, is arranged to concentrate the flux. The flux-concentration arrangement allows high magnetic utilization of the electrical machine. Embedding means that the permanent magnets are positioned in soft-magnetic material in such a way that a soft-magnetic material is adjacent, entirely or in places, to those sides of the permanent magnets on which the magnetic field emerges.

In a further refinement of the electrical machine, its secondary part has at least one means for providing a magnetic return path. By way of example, this means has a laminated core. It is also advantageous to design the secondary part such that it has no magnetic sources. By way of example, magnetic sources are permanent magnets or else windings through which (electrical) current can flow.

In a further embodiment, the secondary part is designed such that it has teeth which point toward the primary part. The main flux is therefore guided within the secondary part via the teeth and via the return path which may be provided. If the flux is guided via the teeth, the flux can in each case be guided, for example, via just one tooth or via at least two teeth.

The first means for production of a first magnetic field is advantageously a winding through which current can flow, as already described. The winding through which current can flow in a machine comprises one or more phases (for example R, Y, B). Each phase comprises one or more coils. One advantageous embodiment of the coils is characterized in that these are concentric coils which are each wound around one tooth (tooth-wound coils), in which case the tooth can be fitted with one or more poles or permanent magnets. The tooth-wound coil is in this case at least one part of a winding. The coil may be in the form of a single coil or else a split coil. The advantage of the winding is that it allows a changing magnetic field to be produced, for example by means of an alternating current, in a very simple manner. By way of example, the electrical machine can also be designed such that it has a plurality of windings or coils, in which case currents of different phases of a three-phase source can flow through these windings.

An electrical machine can also be designed such that a secondary part has teeth which are arranged with a mutual pitch spacing Tau_Sec. The primary part of the electrical machine contains the second means for production of a magnetic excitation field which is formed by a multiplicity of the means (for example a large number of permanent magnets) which are arranged with a pitch spacing of Tau_Prim with respect to one another.

One embodiment of the electrical machine is now distinguished in that the relationship between Tau_Sec and Tau_Prim can be expressed by the following equation:

Tau_Sec=$n$*Tau_Prim where $n$=1, 2, 3, . . .

Tau_Sec can therefore be expressed by an integer multiple of Tau_Prim.

In a further embodiment of the electrical machine, the relationship between Tau_Sec and Tau_Prim can be indicated by the equation:

Tau_Sec=$n$*Tau_Prim where $n$=1, 2, 3, . . .

The pitch spacing Tau_Sec is therefore not an integer multiple of the pitch spacing Tau_Prim.

As has already been described above, a further embodiment of the electrical machine has permanent magnets as further means for production of at least one second magnetic field. The permanent magnets are advantageously arranged on the primary part such that they each produce a magnetic excitation field in different directions.

In one refinement of the arrangement of the permanent magnets, the magnetization directions of the permanent magnets are alternately opposite, although they are parallel.

In a further refinement of the electrical machine, the electrical machine has one primary part and two secondary parts. This primary part is arranged between the two secondary parts. This arrangement is designed such that a magnetic circuit which is formed by a magnetic useful flux is closed via the primary part and the two secondary parts.

In a further refinement of the electrical machine, this machine has two primary parts and one secondary part. The secondary part is arranged between the two primary parts. The primary parts and the secondary part can be designed such that a magnetic circuit which is formed by a magnetic useful flux is closed via the two primary parts and the secondary part.

The primary parts and the secondary part can, however, also be formed such that a magnetic circuit which is formed by a magnetic useful flux is closed via in each case via one primary part and the common secondary part.

BRIEF DESCRIPTION OF THE DRAWING

The following figures show examples of refinements according to the invention of electrical machines according to the invention, corresponding wind power generators and wind power installations. In this case:

FIG. 8 shows a first profile of magnetic fields in the linear motor,
FIG. 9 shows a second profile of magnetic fields in the linear motor,
FIG. 14 shows a linear motor with a primary part which has a pole shoe,
FIG. 15 shows the geometry and field pattern of a linear motor with longitudinal flux alignment,
FIG. 17 shows the geometry and field pattern of a linear motor with tooth magnets with flux concentration,
FIG. 18 shows the geometry and field pattern of a linear motor with yoke magnets with flux concentration.

DETAILED DESCRIPTION OF PREFERRED EMBODIMENTS

Figure 1:
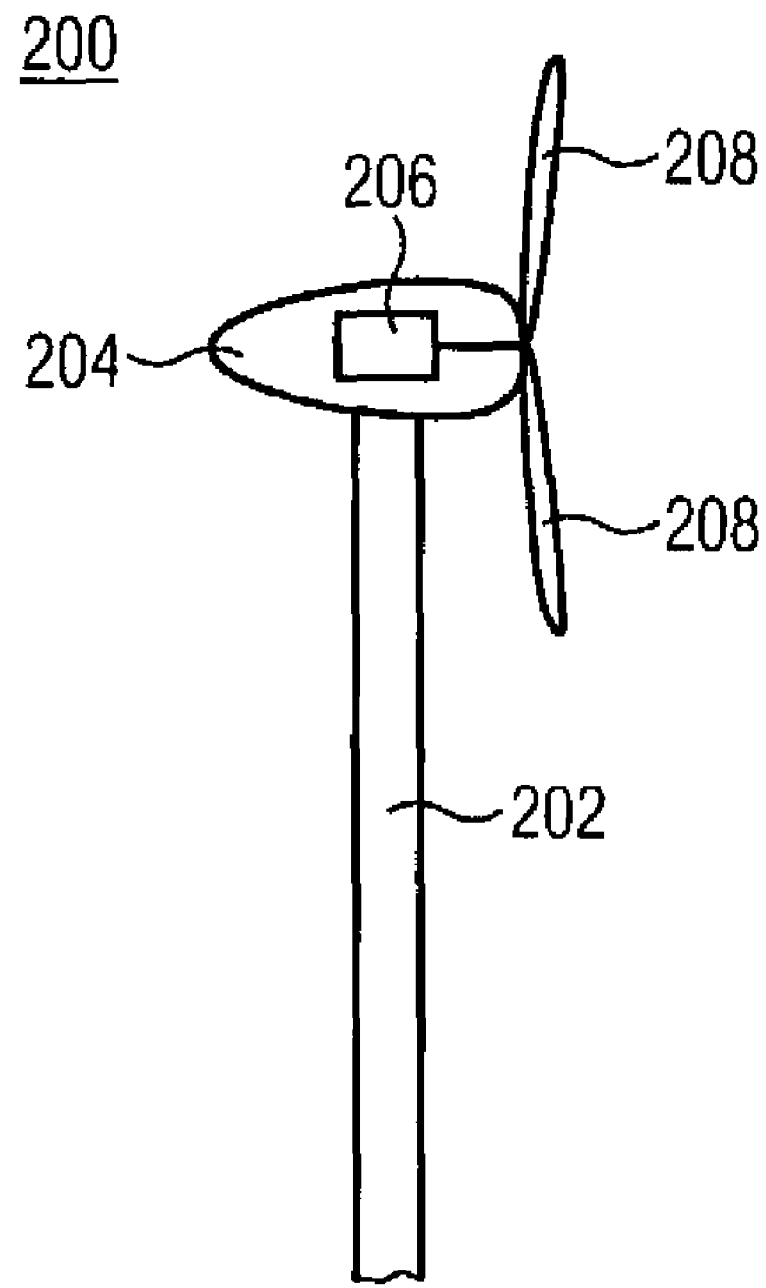
FIG. 1 shows a wind power installation.

The illustration in FIG. 1 shows a wind power installation 200. The wind power installation 200 has a mast 202 and a pod 204 which is fitted to this mast. A wind power generator 206 is accommodated in this pod. The wind power generator 206 is connected to blades 208.

Figure 2:
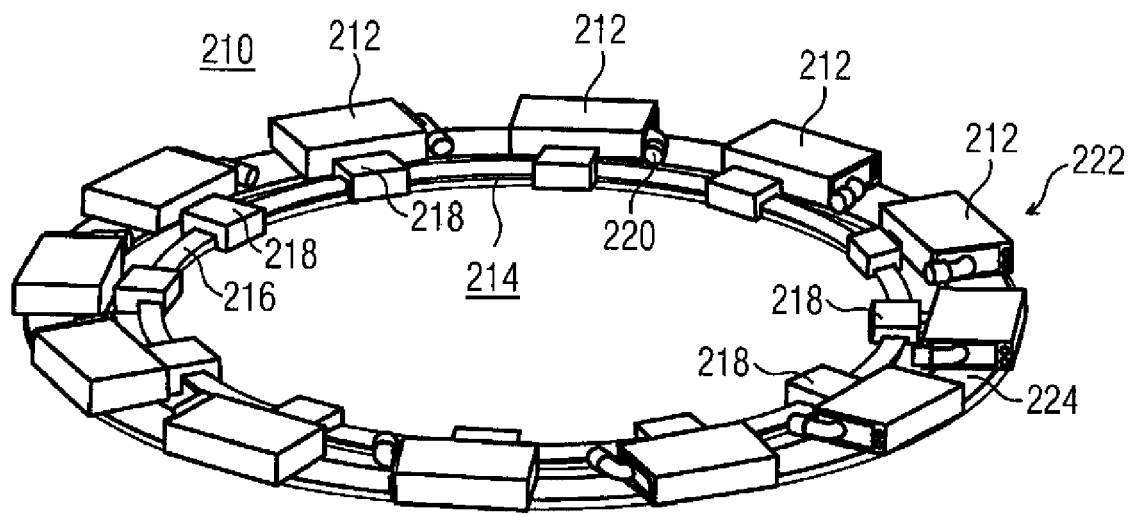
FIG. 2 shows an electrical machine in the form of a disk.

The illustration in FIG. 2 shows an electrical machine 210 in the form of a disk and with an air gap in the form of a disk. This machine has primary part segments 212. The primary part segments 212 are guided by means of a mounting device 214. The mounting device 214 has a guide rail 216 and slides 218 guided thereon. The slides 218 are mechanically connected to the primary part segments 212. The primary part segments 212 can be separated from one another by spacers which are not illustrated. Each of the primary part segments 212 has its own electrical connection 220. The primary part segments 212 are used to form a primary part 222. The primary part is associated with a secondary part 224. The secondary part 224 can be formed as a rotationally symmetrical iron reaction part, in which case the secondary part 224 can be formed from one or more parts, that is to say segmented. The primary part segments 212 are advantageously formed from straight linear-motor stators and are arranged in a circular shape. This results in a circumference of the electrical machine. FIG. 2 shows an annular torque motor composed of straight stator elements and a rotationally symmetrical secondary part.

Figure 3:
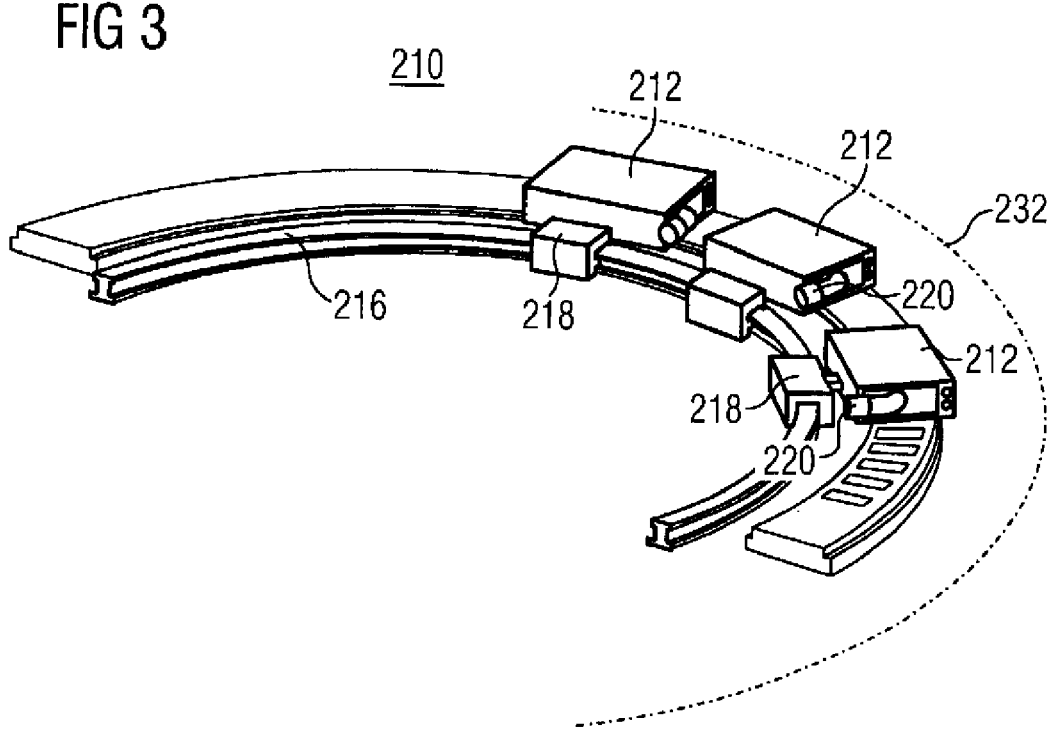
FIG. 3 shows a detail of an electrical machine in the form of a disk.

The illustration in FIG. 3 shows a detail of an electrical machine similar to that in FIG. 2, with the electrical machine 210 having fewer primary part segments 212, and with the secondary part 224 now also having permanent magnets 226. Permanent magnets are integrated in the primary part segments 212 in FIG. 2. A dashed line 232 illustrated in FIG. 3 also shows the position of a further electrical machine, which is in the form of a disk. This further electrical machine which is in the form of a disk but is not illustrated has a larger circumference than the illustrated electrical machine 210 which is in the form of a disk. The internal circumference of the electrical machine which is in the form of a disk but is not illustrated is chosen to be smaller than the external circumference of the illustrated electrical machine 210 in order to ensure that the two can be positioned approximately on the same plane.

Figure 4:
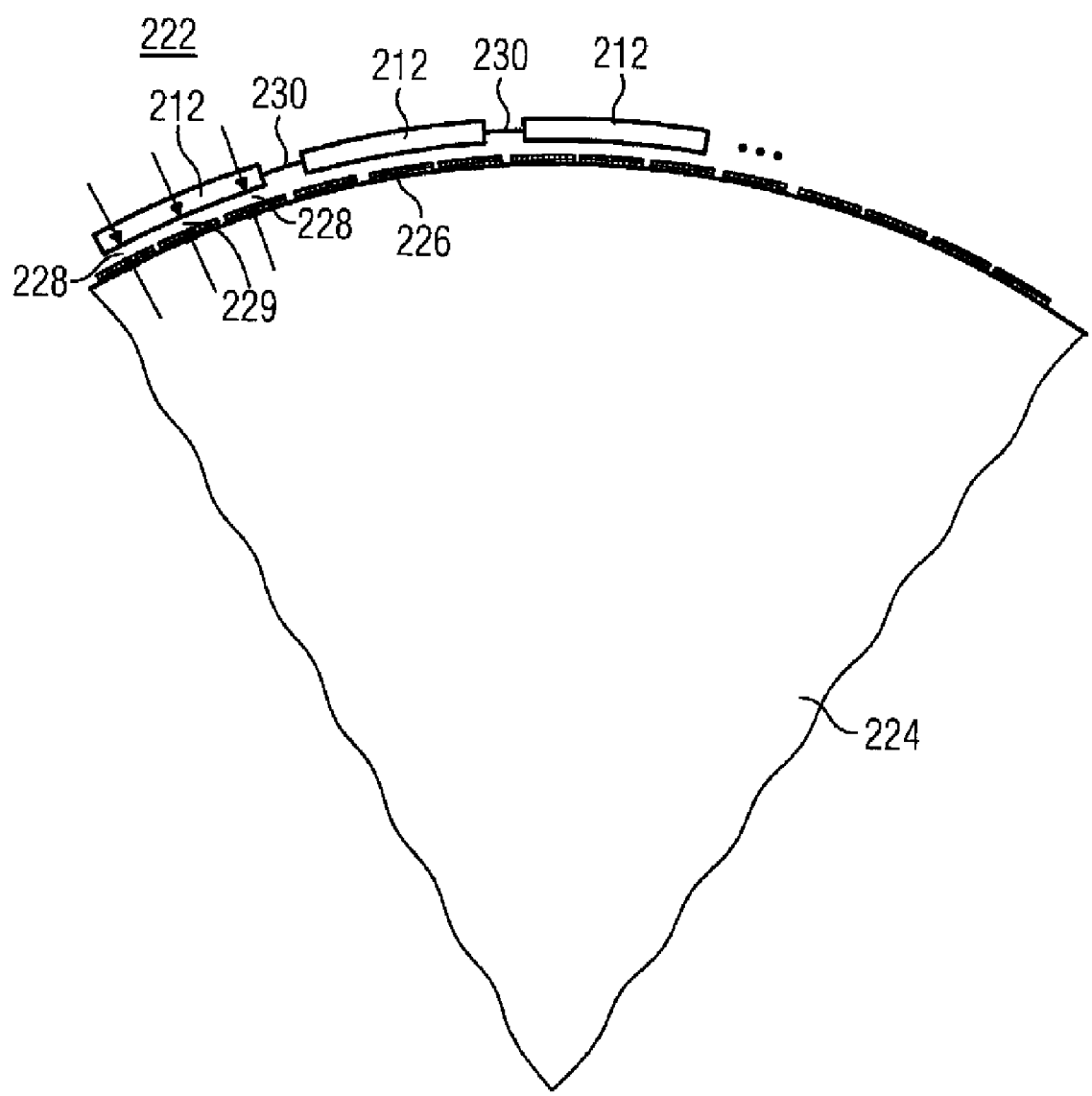
FIG. 4 shows a detail of a cylindrical electrical machine, in the form of a cross section with straight primary part segments.

The illustration in FIG. 4 shows a detail of an electrical machine with a basic cylindrical shape, in the form of a cross section. The secondary part 224 has permanent magnets 226. The primary part 222 has straight primary part segments 212, which are connected to one another by means of connecting elements 230. The straight form of the primary part segments 212 results in different air gap thicknesses 228, 229. Centrally with respect to the primary part segment 212, the air gap 229 is smaller than in the outer areas of the straight primary part segment 212, resulting in a larger air gap 228.

Figure 5:
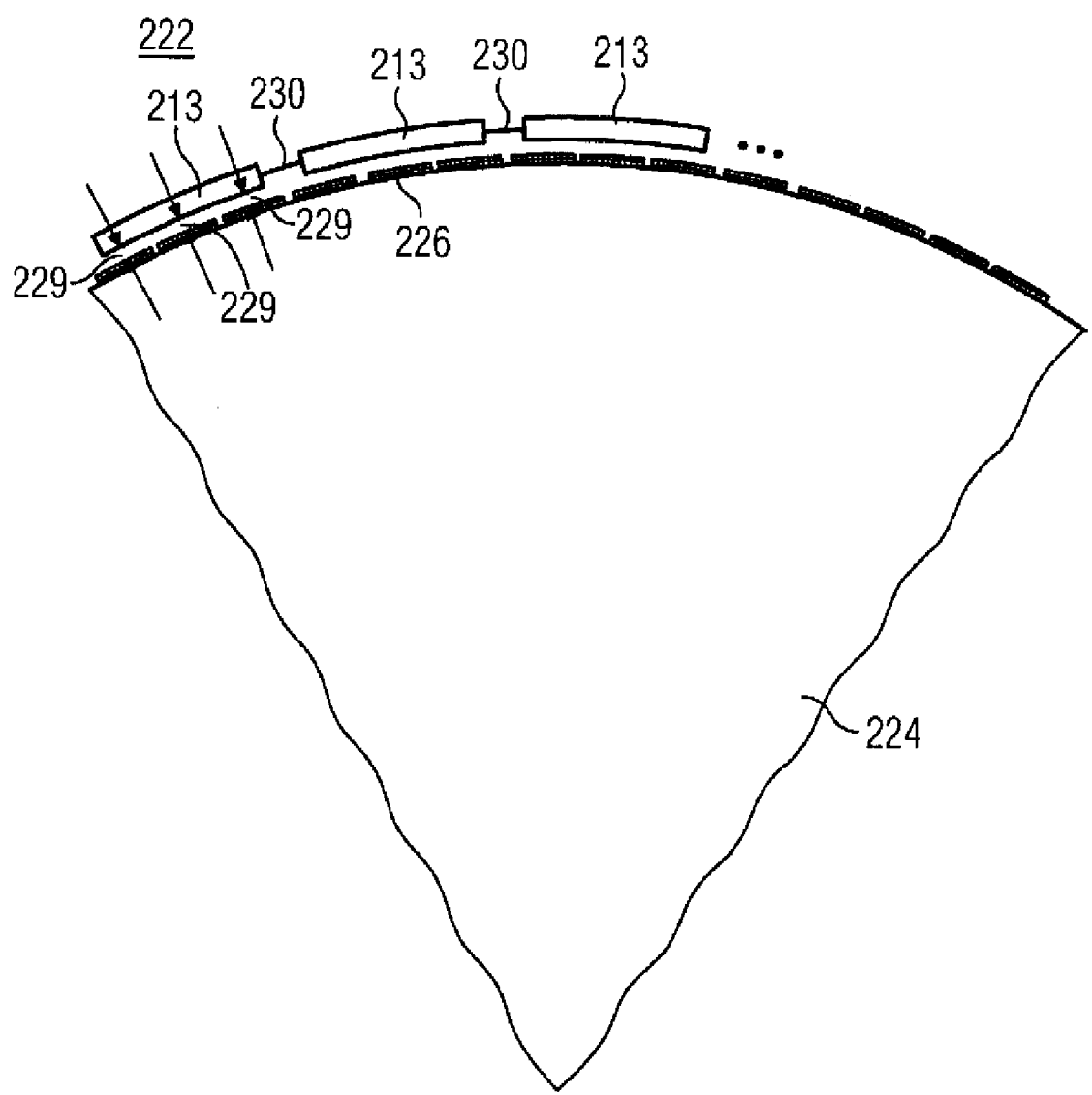
FIG. 5 shows a detail of a cylindrical electrical machine, in the form of a cross section with curved primary part segments.

In contrast to FIG. 4, the illustration in FIG. 5 shows curved primary part segments 213. The curvature in the form of an arc results in the air gap 229 between the primary part 222 and the secondary part 224 being the same independently of the primary part segment 213.

In the case of components which are to be driven and have relatively large diameters, and at the same time relatively low rotation speeds, as is the case in the field of wind power installations, a generator which has segmented primary part segments offers the following advantages, for example:

- scalability of the generator rating possible by the generator being formed from building blocks—flexible configuration of the generator by variation of the series, parallel or individual connection of the primary parts on one or more converters,
- lower production costs of the generator, in comparison to large electrical machines since "standard components" can be used, which can be produced in large quantities using simple (and existing) production facilities,
- use of existing components which are already available for the present generator voltage in the medium-voltage range (up to 720 V DC),
- simple and low-cost assembly of the motor at the installation manufacturer's premises or on site,
- wear-free→increased installation availability.

Figure 6:
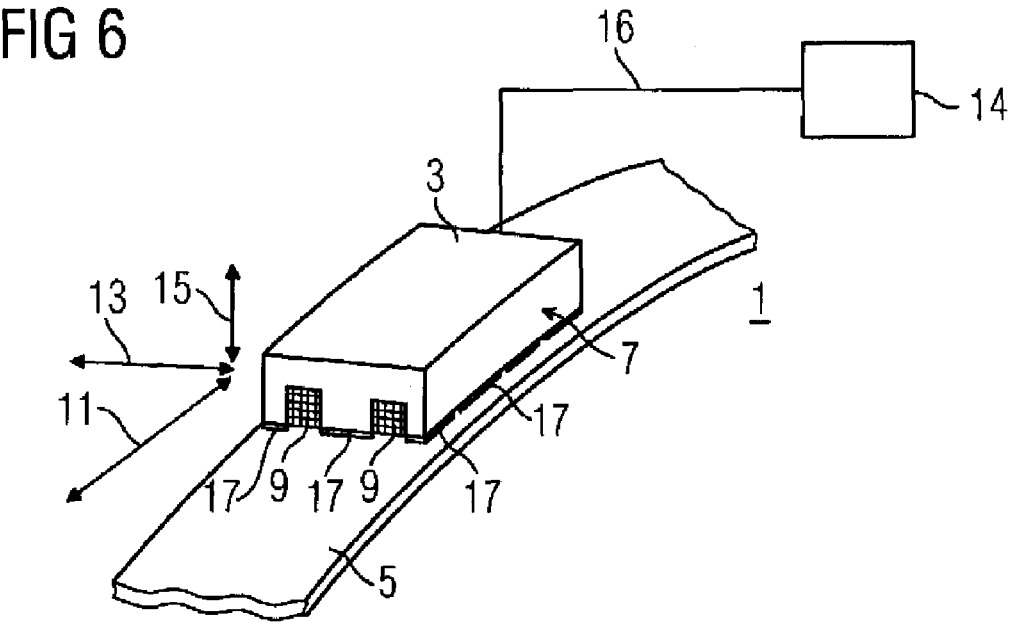
FIG. 6 shows an outline illustration of a linear motor.
Figure 7:
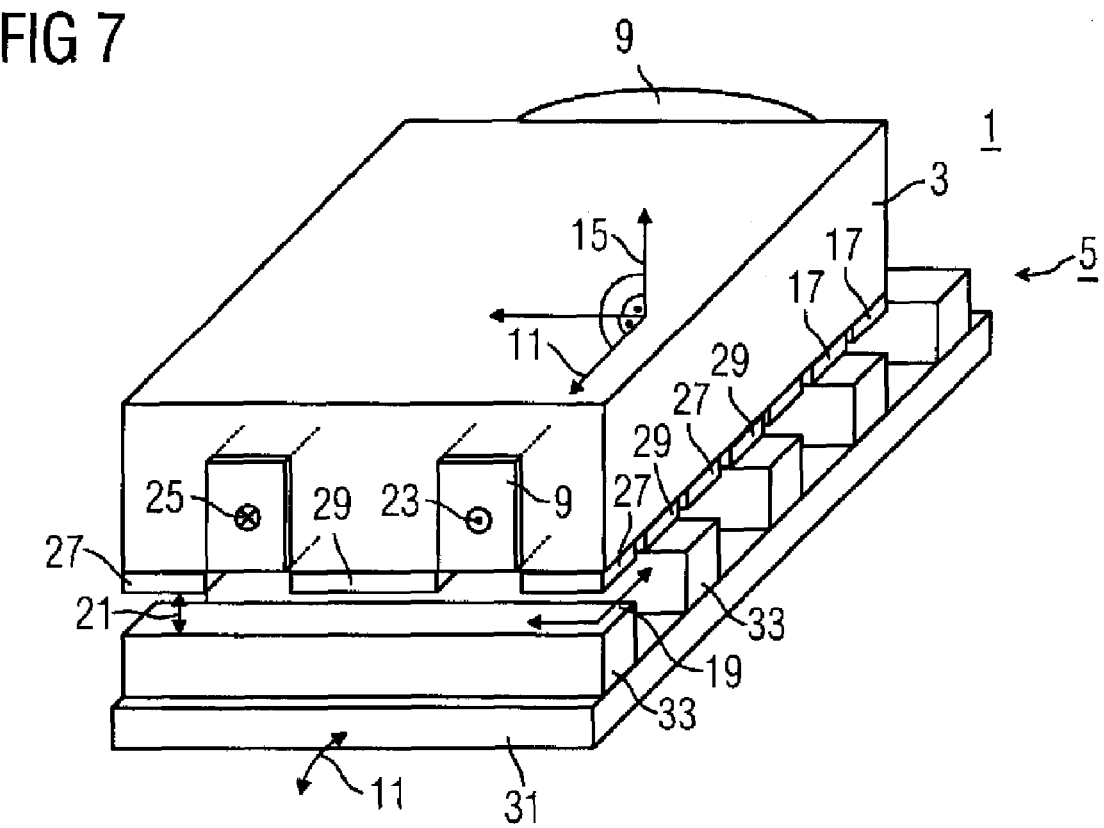
FIG. 7 shows a linear motor with permanent magnets on the primary part.

The illustration in FIG. 6 shows an electrical machine 1. The electrical machine 1 has a primary part 3 and a curved secondary part 5. The secondary part is closed to form a circle, although this is not illustrated. The primary part 3 has a winding 9 and permanent magnets 17. A first double-headed arrow 11 indicates a longitudinal direction, with a further double-headed arrow indicating the lateral direction 13. The normal 15 is defined by means of a third double-headed arrow with the normal being related to an air gap plane 19, although the air gap plane 19 is not illustrated in FIG. 6. However, the air gap plane 19 is illustrated in FIG. 7. An arrow indicates a side view 7 which relates to the illustration shown in FIGS. 8 and 9. The electrical machine 1 is a linear motor which can be operated by means of a converter 14 which is connected via a connecting cable 16.

In the following illustrations, the secondary part and the primary part are always shown as being straight, in order to simplify the illustration in the drawing. In the case of the electrical machine according to the invention, the primary part and the secondary part are always in the form of circles, disks or cylinders.

The illustration in FIG. 7 shows an electrical machine 1. The primary part 3 is in the form of a laminated core, with the primary part 3 having a winding 9. The winding 9 is a phase winding through which an alternating current can flow. The direction of the current at one instant is illustrated in FIG. 7. In this case, the direction is indicated by means of a dot 23 or by means of a cross 25. The laminated primary part 3 has permanent magnets 17 on the side which faces the secondary part 5. The permanent magnets 17 are fitted to the primary part such that their magnetization in the direction of the normal 15 alternates. The magnets (permanent magnets) therefore produce a magnetic flux which alternately points upwards (towards the primary part 3) and downwards (towards the secondary part 5). North-South permanent magnets (N-S) 27 (the magnetization direction points towards the secondary part) therefore alternate with the South-North permanent magnets (S-N) 29 (the magnetization direction points towards the primary part). An air gap 21 is formed between the primary part 3 and the secondary part 5. This air gap 21 lies on the air gap plane 19. The electrical machine 1, which in the present case is a linear machine, moves in the longitudinal direction 11. In this case, it is possible either for the primary part 3 to be stationary and the secondary part 5 to move, or for the secondary part 5 to be stationary and for the primary part 3 to move over the secondary part 5. The winding 9 is a first means for production of a first magnetic field, and the permanent magnets 17 are further means for production of further magnetic fields. The illustration in FIG. 7 shows a lateral flux embodiment of the electrical machine 1. In the lateral flux embodiment, the secondary part 5 is, for example, designed such that it has a mount 31 and bolts 33. At least the bolts 33 are laminated. The lamination is implemented such that one laminate follows another in a curved longitudinal direction 11. The bolts 33 are adhesively bonded, soldered or welded, for example, to the mount 31 or are connected to one another using a combination of attachment options. The lamination is advantageous in order to avoid eddy currents. If the negative eddy current effects are not sharply pronounced (for example in applications with a sufficiently low electrical fundamental frequency), there is no need for lamination, and low-cost solid parts can be used.

The illustration in FIG. 8 shows a detail of a primary part 3 and a secondary part 5. This detail in FIG. 8 schematically illustrates how magnetic fields can be split in a primary part 3, with the form of a side view being chosen in this case, corresponding to the side view 7 shown in FIG. 6. FIG. 8 shows one turn of a winding 10. This also shows that the primary part 3 and the secondary part 5 can be split into sections. The primary part has primary sections 47,49,51 and 53, with these primary sections 47,49,51 and 53 relating to the permanent magnets 27,29. The sections are in this case areas in which, corresponding to the magnetization direction of the permanent magnets 27 and 29, the magnetic flux either runs away from the secondary part 5 or runs towards the secondary part 5. The profile is illustrated by arrows 41,43. The sum of all the magnetic fluxes which are linked with the winding 10 forms a linked flux $\psi$. The linked flux is produced mainly by the magnets which can form a magnetic return path via the secondary part 5. The flux arrows, which are of different length, indicate the flux linked to the winding (coil) for each magnet. The secondary part 5 also has sections corresponding to the bolts 33 that are present. These secondary sections 55,57,59 and 61 therefore correspond to the sections in which a bolt 33 is or is not present. A magnetic flux can be guided by means of the bolts 33. In the present example, the magnetic flux is guided at right angles to an illustrated X-axis 63. The flux therefore runs at right angles to the plane of the sheet on which the figure is illustrated, with this corresponding to a Y-axis 65. The Z-axis is at right angles to the X and Y axes, as a result of which all the axes are mutually perpendicular. A magnetic excitation flux which, for example, is caused by a North-South permanent magnet 27, has its circuit closed via the bolt 33 and the primary part 3 in a second 47, in conjunction with the section 55. In this case, for example, the primary part 3 has a further permanent magnet behind a first North-South permanent magnet 27 (N-S permanent magnet), which further permanent magnet is magnetized in the opposite direction, as a result of which this is an S-N permanent magnet 29. A permanent magnet 29 such as this is, however, not illustrated in FIG. 8 since this comes to rest behind. At the positions where a bolt 33 is opposite a permanent magnet 27,29, this results in a narrow air gap 35. A wide air gap 37 results at adjacent positions, without a bolt 33. Since the air gaps 35 and 37 are not the same, magnetic fluxes 41 and 43 of different strengths are produced by permanent magnets 27 and 29 in sections 47,51 and 49,53. The resultant flux 39 results from the sum of all the fluxes 41 and 43.

Figure 10:
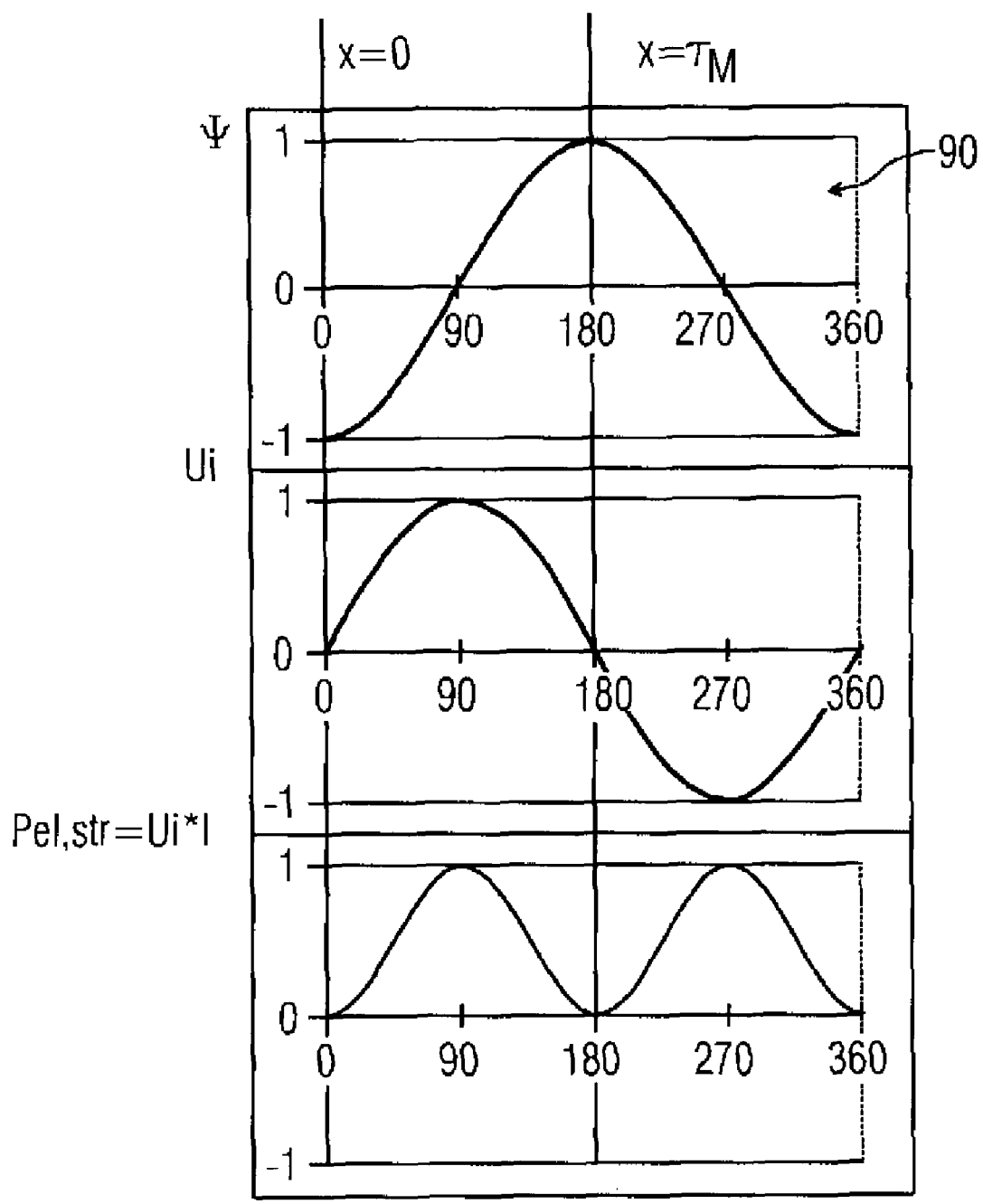
FIG. 10 shows a time profile of flux, induced voltage and power.

The illustration in FIG. 8 shows the magnetic excitation flux 41,43 at the time and for the position of the primary part 3 and secondary part 5 at which a current in the winding 10 has a zero crossing. The position-dependent profile of the magnetic excitation flux and of the induced voltage in the winding, as well as the power which is created in this case in a motor through which current is flowing are illustrated in FIG. 10. The position of the secondary part X=0 illustrated in FIG. 8 results in a negative linked flux $\Psi$, while the position $X=\tau_M$, which is illustrated in FIG. 9, results in a positive flux $\psi$. The illustration in FIG. 9 therefore shows the secondary part 5 in a position $X=\tau_M$. Thus, when the secondary part 5 moves through one magnetic pole pitch, the flux linkage 39 of the coil (winding 10) therefore changes gradually from a negative value to a positive value. The profile of the change can be influenced by geometry parameters such as magnet width, air gap, tooth width (width of the bolts 33) etc. In one advantageous refinement, the aim is for the change to be as sinusoidal as possible.

The illustration in FIG. 10 uses three graphs to show the magnetic linking flux $\Psi$, the induced voltage $U_i$ resulting from this and the electrical power $P_{el,ph}$ of one phase/one winding, in the form of a waveform. The waveform is represented by the indication of the phase position of the voltage. The profile of the flux $\Psi$ also reflects the profile of the magnetic field 90 which can be produced, for example, by means of permanent magnets. For optimum force formation in one phase, the current must be applied in phase with the induced voltage. Furthermore, the positions X=0 and $X=\tau_M$ are shown, with these positions together with the further illustrated profiles of the flux $\Psi$, the voltage $U_i$ and the electrical power $P_{el,ph}$ relating to the symbolic illustration shown in FIGS. 8 and 9. The third graph, on which the electrical power is plotted, shows that the number of motor phases m must be greater than or equal to 2 for a constant power (~force). Three phases are advantageously chosen since three-phase converters require fewer semiconductor valves than those having two or more than three phases.

Figure 11:
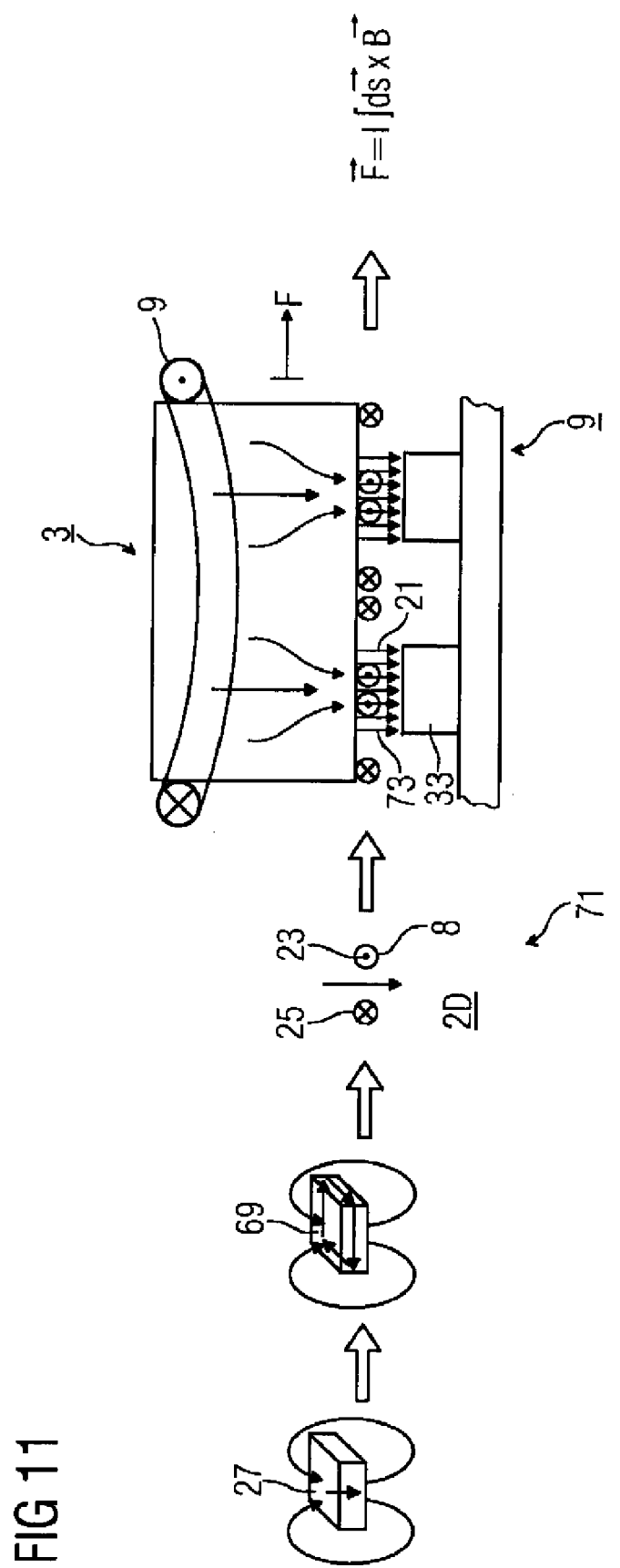
FIG. 11 shows an illustration of the force developed.

The illustration in FIG. 9 is intended to illustrate the technical principle and shows the production of a force F. In order to make the formation of the force in the longitudinal direction of a linear motor somewhat clearer, an auxiliary model is introduced. A permanent magnet 27 is replaced by currents on an envelope surface associated therewith. By way of example, the permanent magnet 27 can thus be represented in an imaginary form by a cuboid, with current flowing on the side surfaces of the cuboid 69, as illustrated. The permanent magnet 27 can thus be represented in a model 71 by a winding, with the direction of the current within the winding being represented by a dot 23 or a cross 25 according to the model. In a two-dimensional representation, the magnet is reduced to the conductor cross section of the equivalent currents. If the magnets are now substituted in the side view of the primary part, this results in the following arrangement. The magnetic field produced by the winding 9 is concentrated in the air gap 21 at the points of the bolts 33, which act as flux guide pieces since this is where the magnetic reluctance is at its minimum. The fictional conductors therefore lie in the field of the phase coil, increasing it on one side and decreasing it on the other side. The conductors "escape" into the area of lower field strength, as is represented by the direction of the force F acting on the primary part in FIG. 11. This relationship is also described by the "right-hand rule", in which the current, the magnetic field and the force F are mutually perpendicular. When the primary part 3 and the secondary part 5 are in the position $X=\tau_{M/2}$ with respect to one another, as shown in FIG. 11, the phase current, that is to say the current through the winding 9, reaches its maximum.

Figure 12:
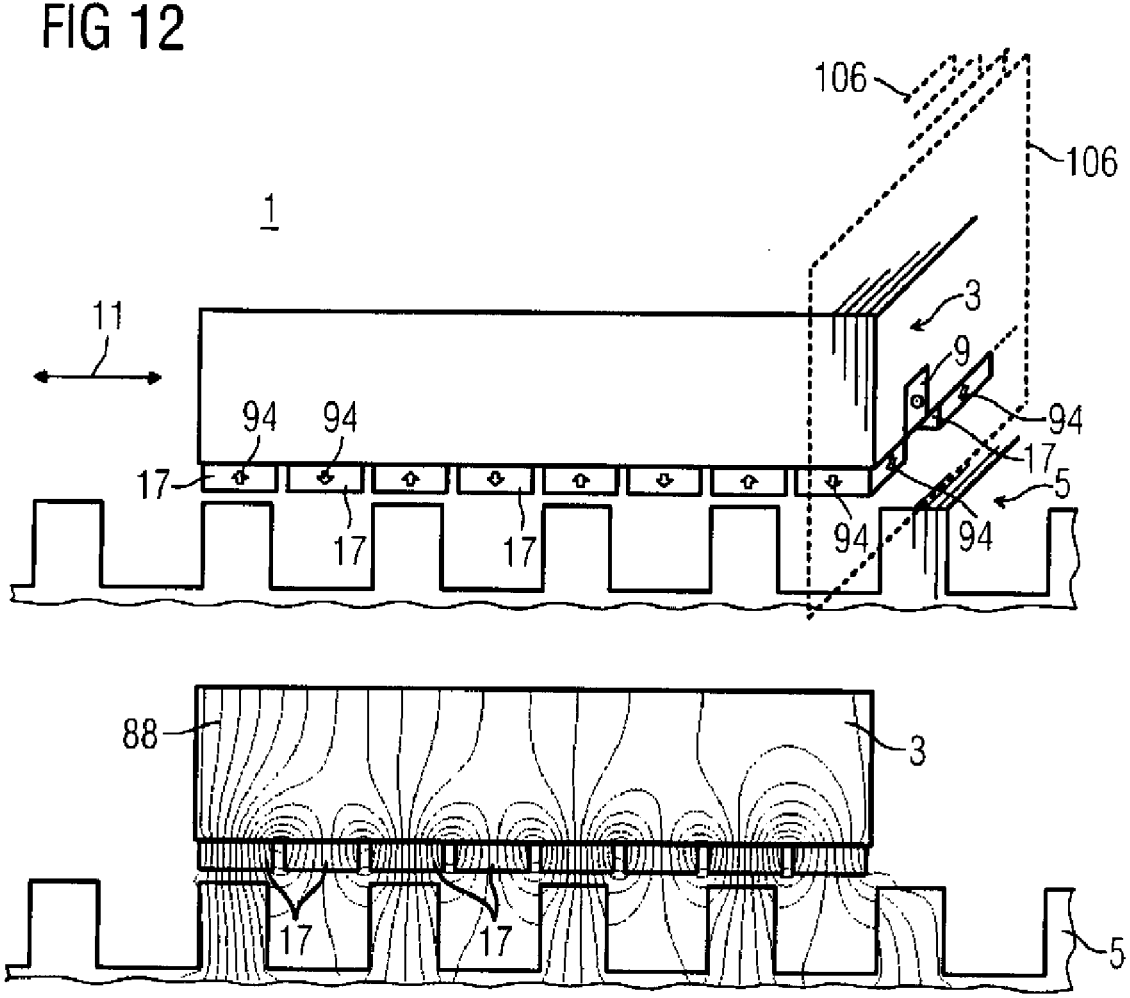
FIG. 12 shows the geometry and field pattern of a linear motor with lateral flux environment.

The illustration in FIG. 12 shows, schematically, the geometry of a lateral-flux linear motor 1 and a magnetic excitation field 88 which is produced by the permanent magnets 17. A magnetic useful flux is guided on a plane (106) which is aligned transversely with respect to a movement direction (11). The magnetic useful flux is the magnetic flux which is coupled or linked to the coil 9. This magnetic useful flux directed in this way forms a lateral-flux magnetic circuit.

The excitation field 88 in FIG. 12 is the further magnetic field or the further magnetic fields. The linear motor 1 has a laminated primary part 3 and a laminated secondary part 5. The stacking direction of the laminated cores is indicated in principle. The magnetization direction 94 of the permanent magnets 17 is indicated by means of arrows. The possible movement direction of the primary part is the longitudinal direction 11.

Figure 13:
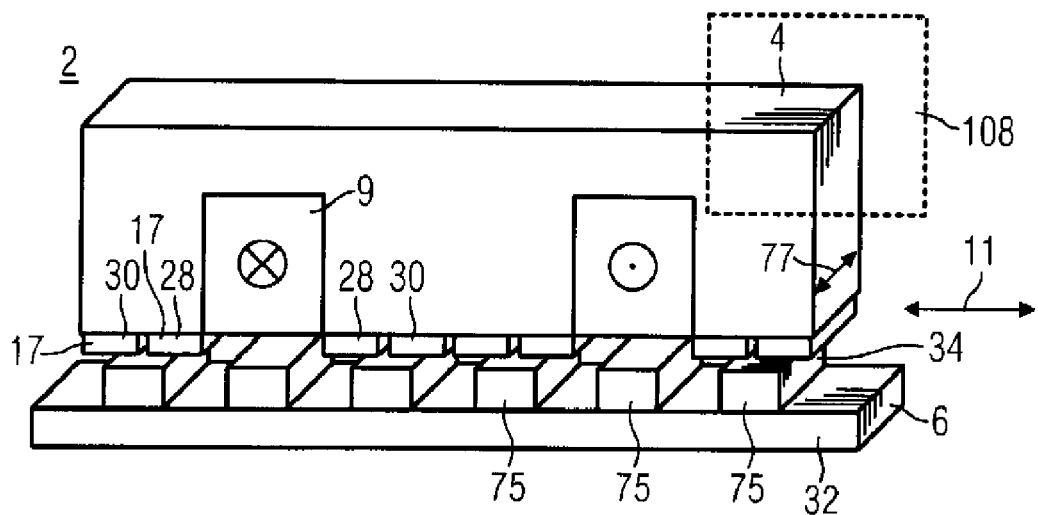
FIG. 13 shows, in perspective, a linear motor with longitudinal flux alignment.

The illustration in FIG. 13 shows a primary part 4 and a secondary part 6. The primary part 4 and the secondary part 6 form the electrical machine 2, with the electrical machine 2 having a longitudinal-flux arrangement. The longitudinal-flux arrangement is distinguished in particular in that the magnetic fields are not closed transversely with respect to the movement direction of the primary part or of the secondary part but along the movement direction of the primary part and along the movement direction of the secondary part. The magnetic flux, which is guided on a plane 180, with the plane 108 being arranged in parallel to the movement direction 11, is a magnetic useful flux. The magnetic useful flux is the magnetic flux which is coupled to the coil 9. This magnetic useful flux, aligned in this way, forms a longitudinal-flux magnetic circuit.

The secondary part 6, as shown in FIG. 13, is laminated both in the area of the mount 32 and in the area of the bolts 34. The arrangement of the magnets on the air gap plane, in contrast to the lateral-flux arrangement, is not in the form of a checkerboard, but is in the form of strips. In the longitudinal-flux variant, the magnets are aligned essentially parallel to the bolts (flux guide pieces). However, in order to reduce force ripples, the magnets can be deliberately position in an inclined position.

In a further advantageous refinement, the secondary part 6 is formed from laminates which are stacked one behind the other over the motor width. In the case of laminates such as these, the mount 32 and the teeth 75 are composed of one part. The stacking of the laminates one behind the other results in the toothed structure of the secondary part with the bolts 34. The nature of the lamination is indicated in FIG. 13. By way of example, the secondary part may be formed from a plurality of parts in the longitudinal direction, such that one secondary part 6 is adjacent to a next secondary part. Such further secondary parts which are adjacent in the movement direction are not illustrated in the illustration of FIG. 13, however. The illustration in FIG. 13 also shows the permanent magnets. The permanent magnets are N-S permanent magnets 28 or S-N permanent magnets 30. By way of example, these permanent magnets extend over the entire width 77 of the laminated core of the primary part 4.

The illustration in FIG. 14 shows a further development of an electrical machine 2 as shown in FIG. 13. In this case, the primary part 4 is designed such that it has pole shoes 79. The pole shoes 79 broaden the contact area for permanent magnets 28,30. This makes it possible to increase the force yielded by the electrical machine 2. Since enlarging the area for positioning of the permanent magnets narrows the area in which a winding 9 can be inserted in the primary part, the primary part 4 is advantageously designed such that it has a winding former 81. The winding former 81 has both a pole shoe 79 and a winding neck 84. The winding 9 can be wound around the winding neck 84 and can then be inserted into the primary part 4. The winding former 81 is advantageously held in the primary part by means of tabs 83. FIG. 14 shows the winding 9 as a phase R of a motor. Further motor phases (for example Y and B) can be provided by primary parts 4 of the same design, although this is not illustrated. In the illustrated position, the permanent magnets 28 and 30 produce the magnetic excitation fluxes 86, whose sum forms the front linkage Ψ of the coil 9. As can be seen from the illustration in FIG. 14, the magnetic excitation fluxes 86, which represent a useful flux, form a longitudinal-flux magnetic circuit.

The illustration in FIG. 15 shows a linear motor 2 with a longitudinal-flux magnetic circuit. This corresponds to the illustration shown in FIG. 14. FIG. 15 additionally shows the distribution of the further magnetic fields 92, illustrated offset downwards in the figure. These further magnetic fields 92 are the magnetic excitation field which is produced by the permanent magnets 17.

Figure 16:
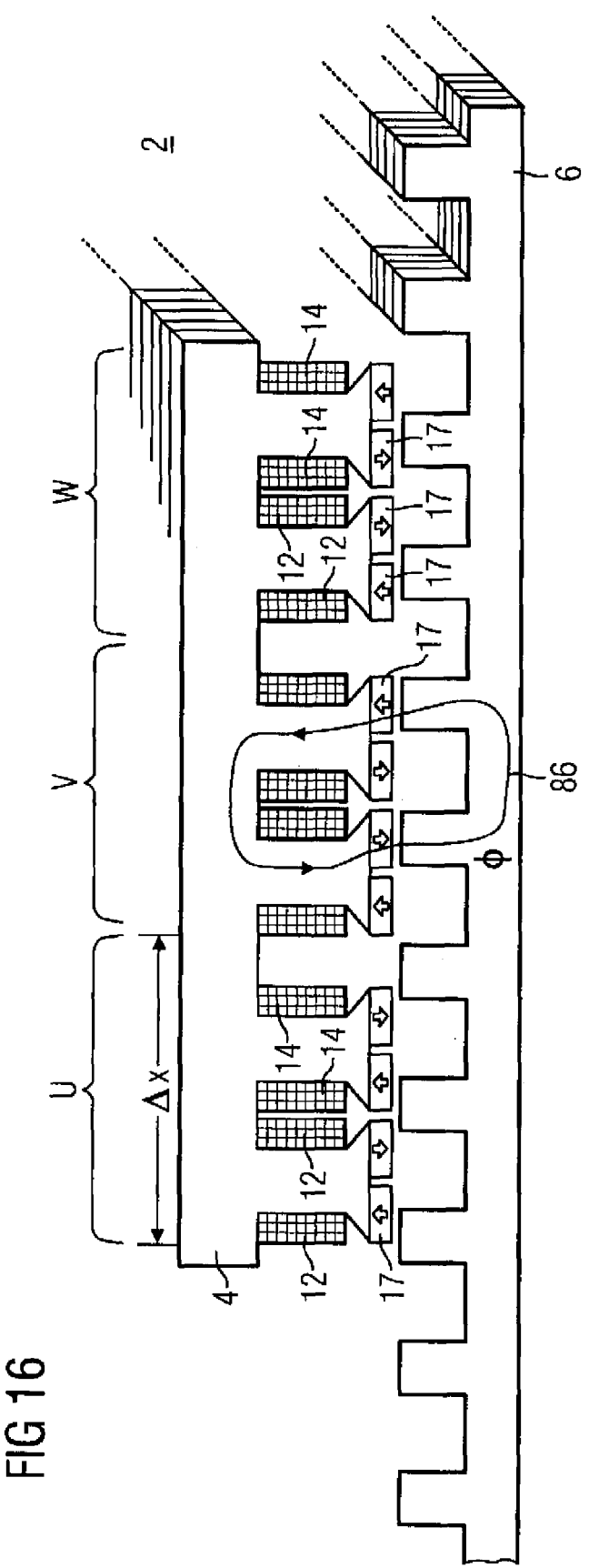
FIG. 16 shows a linear motor with different winding sections for different phases.

The illustration in FIG. 16 shows a further exemplary embodiment of an electrical machine 2, which can now be formed with three phases R, Y and B. Each phase is provided for one phase of a three-phase power supply system. The required phase shift is achieved by geometrically offsetting the phases with respect to one another. The geometric offset Δx in this case corresponds to 120° electrical for the illustrated three-phase machine. FIG. 16 differs from FIG. 15, for example, also in that each phase R, Y and B is not just associated with one tooth-wound coil 9 but their two tooth-wound coils 12 and 14 for the respective phase R, Y and B.

The illustration in FIG. 17 shows an electrical machine 2 in the form of a linear motor, in this case using toothed magnets 18 as permanent magnets. The toothed magnets 18, which are in fact also permanent magnets, are located between, for example, laminated soft-iron material 96. The further magnetic field 86 which is produced by the toothed magnets 18 is indicated by lines with arrows. The magnetization direction 94 of the permanent magnets 18 is likewise illustrated by arrows. The toothed magnets 18 are positioned essentially centrally in a tooth 98 and run essentially parallel to a coil axis 100 of the tooth-wound coil 9. The tooth 98 is surrounded by a tooth-wound coil 9. The upper half of the illustration in FIG. 17 shows the geometric configuration, and the lower half of the figure shows the profile of the magnetic excitation field 88. The magnetic excitation field 88 is the further magnetic field which is produced by means of the toothed magnets 18. The illustration of the excitation field 88 in this case clearly shows the effect of the flux concentration 102. The flux concentration is governed by the magnetic-circuit geometry. Influencing variables are in this case, for example, the magnet dimensions and the laminate section dimensions. The magnetization direction 94 of the toothed magnets 18 (the toothed magnet is a permanent magnet) is mainly parallel to an air gap plane of the air gap 105.

The tooth pitch of the secondary part 6 of the electrical machine 2 as shown in FIG. 17 is not an integer multiple of the magnet pitch of the primary part 4. This applies in particular to the mean value, if the tooth pitch or magnet pitch is not constant.

One and/or more phases of the current can flow through the coils 9. The association between the coils and the individual motor phases is dependent on the chosen tooth pitch ratio between the primary part 4 and the secondary part 6. The illustration in FIG. 17 shows a different tooth pitch for the teeth 98 of the primary part 4 than for the teeth 99 of the secondary part 6. In this case, a polyphase electrical machine can be produced both for the same tooth pitch and for a different tooth pitch on the primary part and secondary part. By way of example, the same tooth pitch is illustrated in FIG. 12 and FIG. 16.

The illustration in FIG. 18 differs from the illustration in FIG. 17 essentially in that yoke magnets 20 are now used, instead of toothed magnets, as further means for production of further magnetic fields. The yoke magnets 20 are also permanent magnets, and are positioned in the area of a yoke 104. The yoke 104 is used to connect the teeth 98. A different excitation field 88 is produced in FIG. 18, as well, in comparison to FIG. 17, by virtue of the positioning of the magnets.

Figure 19:
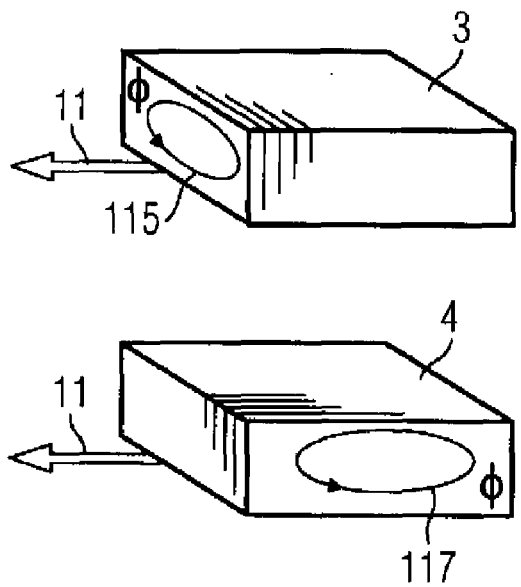
FIG. 19 shows a comparison of a primary part with a lateral flux magnetic circuit and of a primary part with a longitudinal flux magnetic circuit.

The illustration in FIG. 19 shows, schematically, a comparison of a primary part 3 with a lateral-flux magnetic circuit 115 and a primary part 4 with a longitudinal-flux magnetic circuit 117. The primary parts 3,4 are in particular primary parts 3,4 of a synchronous motor which has permanent excitation, but is not illustrated in this figure and which has permanent magnets in the primary part, with the permanent magnets likewise not being illustrated in this figure. The magnetic flux $\phi$ is in each case indicated only symbolically. Further means for production of the magnetic flux $\phi$, such as windings through which a current can flow, are also not illustrated, for reasons associated with better clarity. A possible movement direction 11 is indicated by an arrow. A secondary part which is associated with the respective primary parts 3 and 4 is not illustrated in FIG. 19. The illustration also shows that, if the primary parts 3 and 4 are laminated, their configuration depends on the alignment of the respective magnetic circuit 115 and 117. In the case of the lateral-flux magnetic circuit 115, the magnetic excitation flux $\Phi$ is closed mainly on a plane which is aligned transversely with respect to the movement direction 11. The motor laminates which are used for lamination of the primary part 3,4 follow the flux plane and, for example, are stacked in a longitudinal extent of the primary part 3, with the longitudinal extent being the extent of the primary part 3 in the movement direction 11.

Figure 20:
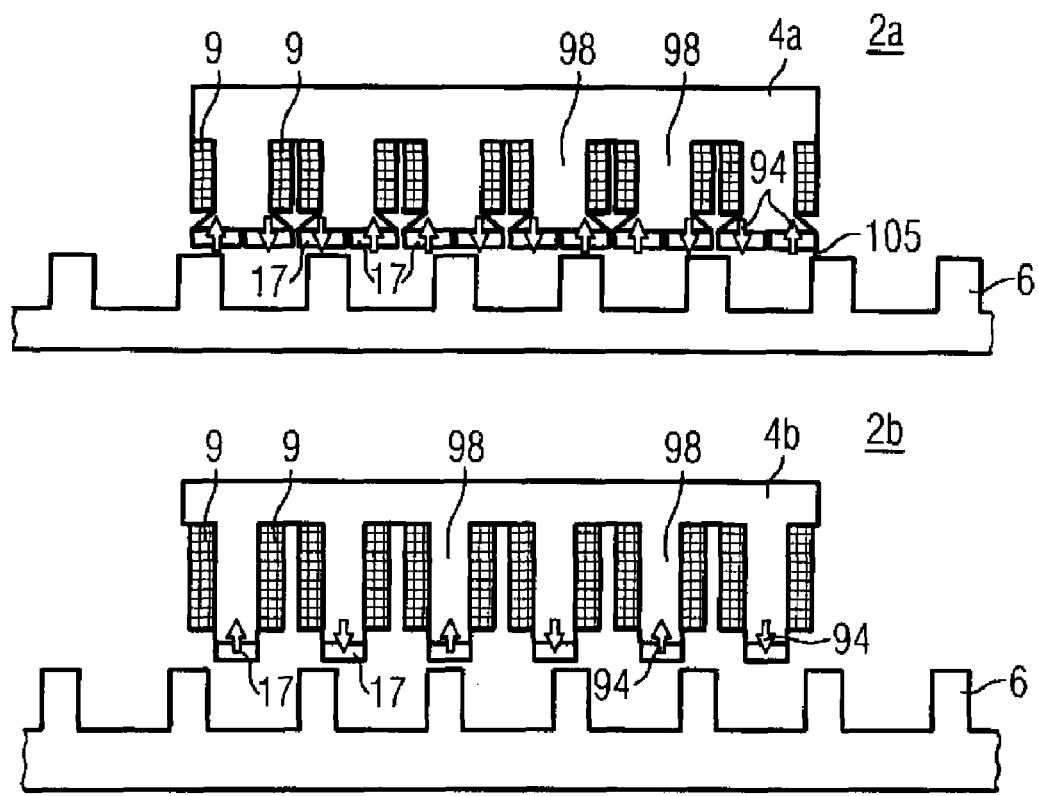
FIG. 20 shows a comparison of electrical machines with an alternating flux arrangement and a unidirectional flux arrangement.

The illustration in FIG. 20 shows a comparison of electrical machines 2a and 2b, with both electrical machines 2a,2b being linear motors. The electrical machine 2a has a primary part 4a which has teeth 98, with permanent magnets 17 which have a different magnetization direction 94 being fitted to in each case one tooth 98. The permanent magnets 17 are fitted to the side of the primary part which faces an air gap 105. The magnetization direction 94 of the permanent magnets 17 is mainly at right angles to the air gap plane.

As shown in FIG. 20, one tooth-wound coil 9 is wound around each of the teeth 98. Since each of the teeth 98 now has permanent magnets 17 with opposite magnetization directions 94, this results in a magnetic alternating flux when the primary part 4a moves relative to the secondary part 6. The electrical machine 2a therefore has an alternating flux arrangement. When the secondary part 6 moves relative to the primary part 4a, the permanent magnets 17 which are used to form a (magnetic) excitation field produce a magnetic alternating flux in the magnetic circuit. The magnetization directions 94 of the individual permanent magnets 17 are therefore aligned such that a magnetic alternating flux is produced by movement of the toothed secondary part 6 in those magnetic circuit sections in the primary part 4a in which coils are fitted.

The electrical machine 2b shown in FIG. 20 also has a primary part 4b which has teeth 98. In contrast to the electrical machine 2a, the teeth 98 in the electrical machine 2b have only one permanent magnet 17 for each tooth 98. Since the permanent magnet 17 has a magnetization direction 94, each tooth 98 is associated with only one magnetization direction 94. An electrical machine 2b can also be designed such that one tooth 98 has a plurality of permanent magnets, although these have the same magnetization direction with respect to a tooth 98. This embodiment variant is not illustrated explicitly in FIG. 20. In the case of the electrical machine 2b, the magnetization directions 94 both alternate with the teeth 98 on the primary part 4b. Each tooth therefore alternately has a different magnetization direction 94. Since the teeth 98 now have permanent magnets 17 with opposite magnetization directions 94, this results in a magnetic unidirectional flux when the primary part 4b is moved relative to the secondary part 6. The electrical machine 2b therefore has a unidirectional-flux arrangement. A magnetic unidirectional flux is produced in the magnetic circuit by means of the permanent magnets 17, which are used to form a (magnetic) excitation field, when the secondary part 6 moves relative to the primary part 4b. The magnetization directions 94 of the individual permanent magnets 17 in the electrical machine 2b in FIG. 20 are aligned such that a magnetic unidirectional flux is produced by a movement of the toothed secondary part 6 in those magnetic circuit sections of the primary part 4b in which coils are fitted, in which case the magnetic unidirectional flux does not change its direction, and oscillates periodically between a maximum and a minimum value.

Figure 21:
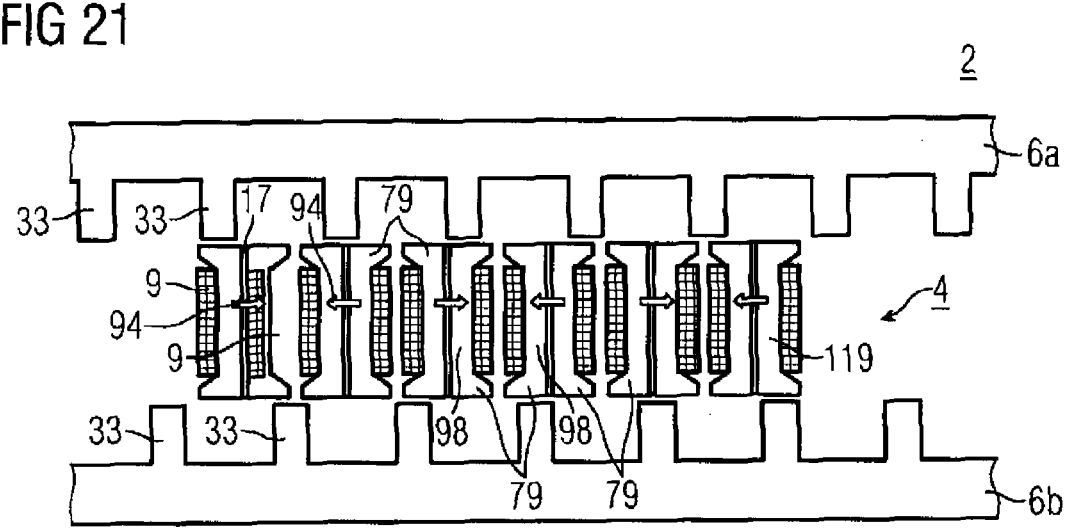
FIG. 21 shows an electrical machine with secondary parts arranged on two sides.

In the illustrations in FIG. 20 or else FIG. 17, an arrangement is chosen in which a force effect can be achieved between a primary part and a secondary part. The illustration in FIG. 21 shows an arrangement of an electrical machine which has a primary part 4 and two secondary parts 6a and 6b. A force effect therefore results between just one primary part 4 and two secondary parts 6a and 6b. This results in the force which can be produced being approximately doubled. The teeth 98 of the primary part 3 of the linear motor shown in FIG. 21 each have two pole shoes 79, with one secondary part 6a or 6b facing each pole shoe 79. This embodiment of the electrical machine 2 shown in FIG. 21 is a form of development of the electrical machine 2 shown in FIG. 17. The double-sided arrangement of the secondary parts is in this case not restricted to the embodiment of the primary part 4 illustrated in FIG. 21, in which the permanent magnets 17 are embedded in a soft-magnetic material 119. Primary parts can also be produced which have permanent magnets on the pole shoes. However, FIG. 21 does not illustrate an embodiment such as this.

Figure 22:
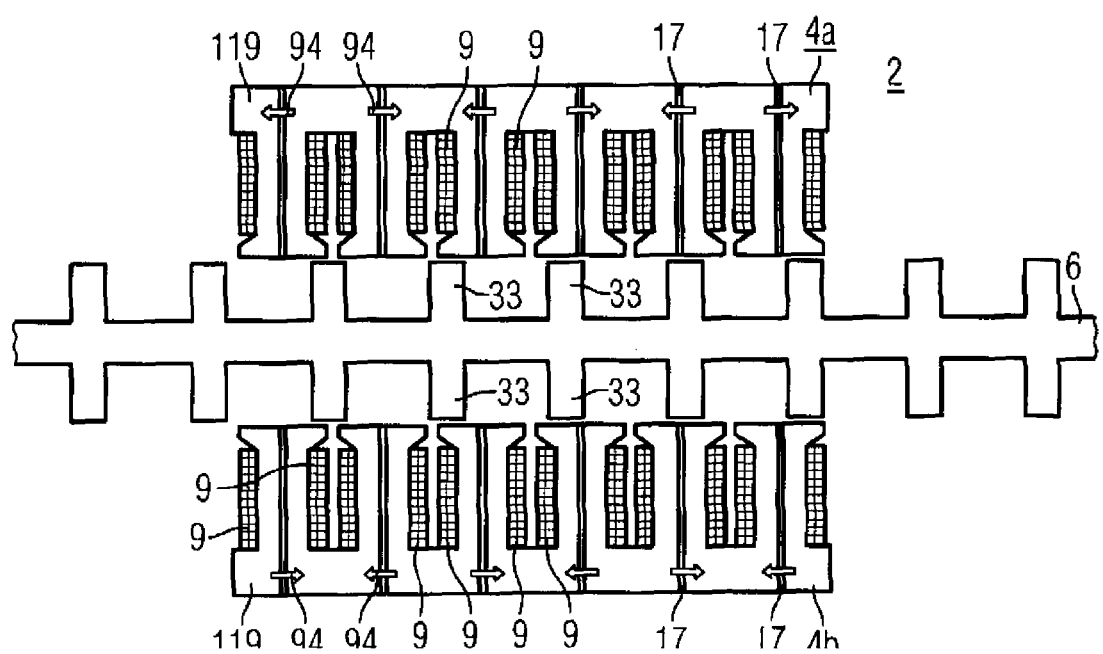
FIG. 22 shows an electrical machine with primary parts arranged on two sides.

The illustration in FIG. 22 shows an arrangement of an electrical machine 2 which has two primary parts 4a and 4b and only one associated secondary part 6. A force effect therefore results between only one secondary part 6 and two primary parts 4a and 4b. This results in the force which can be produced being approximately doubled. The teeth 3 of the secondary part of the linear motor 2 shown in FIG. 21 are aligned on both sides with respect to in each case one primary part 4a and 4b. Teeth 33 of one of the secondary parts 5 are therefore associated with each primary part 4a and 4b. This embodiment of the electrical machine 2 shown in FIG. 22 is a form of development of the electrical machine 2 shown in FIG. 17. The double-sided arrangement of the primary parts 4a and 4b is in this case not restricted to the embodiment of the primary part 4a illustrated in FIG. 21, in which the permanent magnets 17 are embedded in a soft-magnetic material 119. Primary parts can also be produced which, for example, as shown in FIG. 15 have permanent magnets on the pole shoes. However, FIG. 22 does not illustrate an embodiment such as this.

Figure 23:
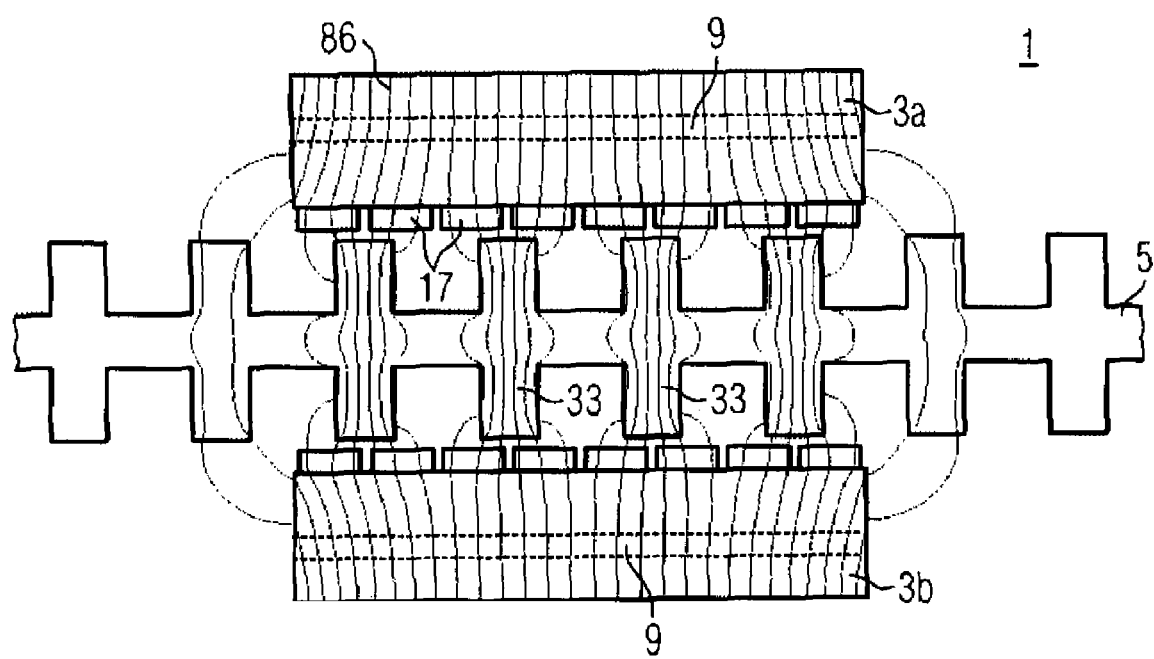
FIG. 23 shows a magnetic field profile of a lateral flux magnetic circuit arrangement, which field profile is produced by an electric current.

By way of example, the illustration in FIG. 23 shows the magnetic field profile for an electrical machine 1 which has two primary parts 3a and 3b and one secondary part 5. The primary parts 3a and 3b have permanent magnets 17 and a winding 9. The illustration in FIG. 23 shows the magnetic flux 86 which results from a current through the winding 9, which is illustrated by a dashed line, on the primary parts. The magnetic flux caused by the permanent magnets is not considered in the case of the magnetic flux 86 illustrated in FIG. 23.

What is claimed is:

1. An electrical machine, comprising:
a primary part formed as a disc and being at least in part constructed from a primary part used in a linear motor, and
a secondary part formed as a disc and spaced from the primary part by an air gap,
wherein at least one of the primary part and the secondary part comprises segments, with the primary part segments each having a laminated core comprising a plurality of teeth having each a flat surface facing the air gap, with the flat surfaces of the plurality of teeth of each primary part segment terminating in a common plane, and slots arranged parallel to one another between the plurality of teeth and holding windings, with each primary part segment having a dedicated electrical connection,
wherein the primary part segments or the secondary part segments are configured as polygons which are fitted inside a circular contour.

2. The electrical machine of claim 1, wherein the electrical connection comprises a device for forming a detachable electrical contact.

3. The electrical machine of claim 1, wherein the primary part segment or the secondary part segment is detachably mounted on a mounting device.

4. The electrical machine of claim 1, wherein the primary part segments or the secondary part segments are configured as polygons which are fitted inside a circular contour.

5. The electrical machine of claim 1, wherein the secondary part or the primary part, or both, have a circular contour.

6. The electrical machine of claim 1, wherein the secondary part has a circular contour and the primary part has an approximately circular contour.

7. The electrical machine of claim 1, wherein the secondary part comprises permanent magnets which are positioned alongside one another with an angular offset.

8. The electrical machine of claim 1, wherein the primary part comprises at least one additional element for producing an additional magnetic field superimposed on a magnetic field produced by the windings of the primary part segments, and wherein the secondary part comprising a magnetic flux conductor for guiding the magnetic field and the additional magnetic field.

9. The electrical machine of claim 8, wherein the magnetic flux conductor has a tooth structure.

10. The electrical machine of claim 1, further comprising a guidance device for guiding the primary part segments.

11. The electrical machine of claim 8, wherein the electrical machine is a synchronous machine.

12. The electrical machine of claim 1, wherein the electrical machine is a generator.

13. An electrical machine, comprising:
a primary part formed as a cylinder and being at least in part constructed from a primary part used in a linear motor, and
a secondary part formed as a cylinder and spaced from the primary part by a cylindrical air gap,
wherein at least one of the primary part and the secondary part comprises segments, with the primary part segments each having a laminated core comprising a plurality of teeth having each a flat surface facing the cylindrical air gap, with the flat surfaces of the plurality of teeth of each primary part segment terminating in a common plane, and slots arranged parallel to one another between the plurality of teeth and holding windings, with each primary part segment having a dedicated electrical connection.

14. The electrical machine of claim 13, wherein the electrical connection comprises a device for forming a detachable electrical contact.

15. The electrical machine of claim 13, wherein the primary part segment or the secondary part segment is detachably mounted on a mounting device.

16. The electrical machine of claim 13, wherein the primary part segments or the secondary part segments are configured as polygons which are fitted inside a circular contour.

17. The electrical machine of claim 13, wherein the secondary part or the primary part, or both, have a circular contour.

18. The electrical machine of claim 13, wherein the secondary part has a circular contour and the primary part has an approximately circular contour.

19. The electrical machine of claim 13, wherein the secondary part comprises permanent magnets which are positioned alongside one another with an angular offset.

20. The electrical machine of claim 13, wherein the primary part comprises at least one additional element for producing an additional magnetic field superimposed on a magnetic field produced by the windings of the primary part segments, and wherein the secondary part comprising a magnetic flux conductor for guiding the magnetic field and the additional magnetic field.

21. The electrical machine of claim 20, wherein the magnetic flux conductor has a tooth structure.

22. The electrical machine of claim 13, further comprising a guidance device for guiding the primary part segments.

23. The electrical machine of claim 20, wherein the electrical machine is a synchronous machine.

24. The electrical machine of claim 13, wherein the electrical machine is a generator.

25. A wind power generator, comprising an electrical machine, said electrical machine including a primary part formed as a disc and being at least in part constructed from a primary part used in a linear motor, and a secondary part formed as a disc and spaced from the primary part by an air gap, wherein at least one of the primary part and the secondary part comprises segments, with the primary part segments each having a laminated core comprising teeth having a flat surface facing the air gap, with the flat surfaces of the plurality of teeth of each primary part segment terminating in a common plane, and slots arranged parallel to one another between the teeth and holding windings, with each primary part segment having a dedicated electrical connection, wherein the primary part segments or the secondary part segments are configured as polygons which are fitted inside a circular contour.

26. A wind power generator, comprising an electrical machine, said electrical machine including a primary part formed as a cylinder and being at least in part constructed from a primary part used in a linear motor, and a secondary part formed as a cylinder and spaced from the primary part by a cylindrical air gap, wherein at least one of the primary part and the secondary part comprises segments, with the primary part segments each having a laminated core comprising a plurality of teeth having each a flat surface facing the cylindrical air gap, with the flat surfaces of the plurality of teeth of each primary part segment terminating in a common plane, and slots arranged parallel to one another between the plurality of teeth and holding windings, with each primary part segment having a dedicated electrical connection.

27. A wind power generator assembly having at least two wind power generators, each having an electrical machine including a primary part formed as a disc and being at least in part constructed from a primary part used in a linear motor, and a secondary part formed as a disc and spaced from the primary part by an air gap, wherein at least one of the primary part and the secondary part comprises segments, with the primary part segments each having a laminated core comprising a plurality of teeth having each a flat surface facing the air gap, with the flat surfaces of the plurality of teeth of each primary part segment terminating in a common plane, and slots arranged parallel to one another between the plurality of teeth and holding windings, with each primary part segment having a dedicated electrical connection, wherein the primary part segments or the secondary part segments are configured as polygons which are fitted inside a circular contour, wherein the at least two wind power generators are arranged consecutively in an axial direction.

28. A wind power generator assembly having at least two wind power generators, each having an electrical machine including a primary part formed as a cylinder and being at least in part constructed from a primary part used in a linear motor, and a secondary part formed as a cylinder and spaced from the primary part by a cylindrical air gap, wherein at least one of the primary part and the secondary part comprises segments, with the primary part segments each having a laminated core comprising a plurality of teeth having each a flat surface facing the cylindrical air gap, with the flat surfaces of the plurality of teeth of each primary part segment terminating in a common plane, and slots arranged parallel to one another between the plurality of teeth and holding windings, with each primary part segment having a dedicated electrical connection, wherein the at least two wind power generators are arranged consecutively in an axial direction.

29. The electrical machine of claim 1, wherein the different primary part segments are fitted on different diameters or radii.

30. The electrical machine of claim 13, wherein the primary part has connected straight primary part segments producing different air gap thicknesses, with the air gap at a center of a straight primary part segment being smaller than in an outer area of the straight primary part segment.

* * * * *